US010951334B2

(12) United States Patent
Simon et al.

(10) Patent No.: US 10,951,334 B2
(45) Date of Patent: Mar. 16, 2021

(54) BROADCAST RELAYING VIA COOPERATIVE MULTI-CHANNEL TRANSMISSION

(71) Applicant: Sinclair Broadcast Group, Inc., Hunt Valley, MD (US)

(72) Inventors: Michael John Simon, Frederick, MD (US); Louis Herbert Libin, Woodmere, NY (US)

(73) Assignee: SINCLAIR BROADCAST GROUP, INC., Hunt Valley, MD (US)

( * ) Notice: Subject to any disclaimer, the term of this patent is extended or adjusted under 35 U.S.C. 154(b) by 0 days.

(21) Appl. No.: 16/184,572

(22) Filed: Nov. 8, 2018

(65) Prior Publication Data

US 2019/0199460 A1 Jun. 27, 2019

Related U.S. Application Data

(60) Provisional application No. 62/586,055, filed on Nov. 14, 2017.

(51) Int. Cl.
*H04H 20/33* (2008.01)
*H04N 21/61* (2011.01)
(Continued)

(52) U.S. Cl.
CPC .......... *H04H 20/33* (2013.01); *H04B 7/0413* (2013.01); *H04H 20/18* (2013.01); *H04H 20/67* (2013.01);
(Continued)

(58) Field of Classification Search
CPC .. H04B 7/0413; H04B 7/15592; H04H 20/02; H04H 20/18; H04H 20/33; H04H 20/67;
(Continued)

(56) References Cited

U.S. PATENT DOCUMENTS 7,336,646 B2 * 2/2008 Muller ................... H04H 20/67 348/384.1
7,599,442 B2 * 10/2009 Mattsson .............. H04L 1/0059 375/265
(Continued)

FOREIGN PATENT DOCUMENTS

WO WO-2016163620 A1 * 10/2016 ......... H04L 27/2649
WO WO-2016163621 A1 * 10/2016 ......... H04L 27/2649

OTHER PUBLICATIONS

Advanced Television Systems Committee (ATSC), ATSC Standard: A/321, System Discovery and Signaling, Mar. 23, 2016, ATSC (accessed at https://www.atsc.org/wp-content/uploads/2016/03/A321-2016-System-Discovery-and-Signaling-5-1.pdf on Jul. 20, 2020) (Year: 2016).*

(Continued)

*Primary Examiner* — Eric Nowlin
(74) *Attorney, Agent, or Firm* — Sterne, Kessler, Goldstein & Fox P.L.L.C.

(57) ABSTRACT

Systems and methods for relaying in broadcast single-frequency networks are disclosed herein. A single-frequency network can be formed in part using transmitters that receive data via a cooperative relay channel instead of a station-to-transmitter link. In some embodiments, a second channel may use a portion of its transmission time to relay the information to the single-frequency network transmitter using time-division multiplexing. In other embodiments, a second channel may encode the relayed information on a second layer using layer-division multiplexing.

19 Claims, 26 Drawing Sheets

(51) Int. Cl.

| | |
|---|---|
| *H04N 21/2385* | (2011.01) |
| *H04J 11/00* | (2006.01) |
| *H04H 20/18* | (2008.01) |
| *H04N 21/2343* | (2011.01) |
| *H04N 7/08* | (2006.01) |
| *H04B 7/0413* | (2017.01) |
| *H04N 21/63* | (2011.01) |
| *H04H 20/67* | (2008.01) |
| *H04L 1/00* | (2006.01) |
| *H04B 7/155* | (2006.01) |
| *H04H 20/02* | (2008.01) |

(52) U.S. Cl.
CPC .......... *H04J 11/004* (2013.01); *H04L 1/0057* (2013.01); *H04L 1/0071* (2013.01); *H04L 1/0076* (2013.01); *H04N 7/08* (2013.01); *H04N 21/2385* (2013.01); *H04N 21/234327* (2013.01); *H04N 21/6112* (2013.01); *H04N 21/631* (2013.01); *H04B 7/15592* (2013.01); *H04H 20/02* (2013.01)

(58) Field of Classification Search
CPC .... H04J 11/004; H04L 1/0041; H04L 1/0045; H04L 1/0057; H04L 1/0071; H04L 1/0075; H04L 1/0076; H04L 12/18; H04L 49/201; H04N 7/08; H04N 21/234327; H04N 21/2385; H04N 21/6112; H04N 21/631
See application file for complete search history.

(56) References Cited

U.S. PATENT DOCUMENTS

| | | | | |
|---|---|---|---|---|
| 10,404,351 | B2* | 9/2019 | Seo | H04J 11/004 |
| 10,439,683 | B1* | 10/2019 | Baumgartner | H04B 7/0413 |
| 2006/0088023 | A1* | 4/2006 | Muller | H04H 20/67 370/350 |
| 2008/0310453 | A1* | 12/2008 | Bargauan | H04H 20/18 370/476 |
| 2012/0185909 | A1* | 7/2012 | Seo | H04H 20/02 725/149 |
| 2016/0234353 | A1* | 8/2016 | Kwon | H04H 20/33 |
| 2016/0277150 | A1* | 9/2016 | Baek | H03M 13/2792 |
| 2016/0294509 | A1* | 10/2016 | Shin | H04L 27/2649 |
| 2016/0294598 | A1* | 10/2016 | Shin | H04L 27/2649 |
| 2017/0272692 | A1 | 9/2017 | Lee et al. | |
| 2017/0324498 | A1* | 11/2017 | Seo | H04B 7/14 |
| 2018/0098207 | A1* | 4/2018 | Difrancesco | H04H 60/88 |
| 2018/0192254 | A1* | 7/2018 | Lee | H04L 27/2605 |
| 2019/0199460 | A1* | 6/2019 | Simon | H04L 1/0076 |
| 2019/0273534 | A1* | 9/2019 | Wang | H04W 72/1273 |

OTHER PUBLICATIONS

Advanced Television Systems Committee (ATSC), ATSC Standard: Physical Layer Protocol (A/322), Jan. 5, 2018, ATSC (accessed at https://www.atsc.org/wp-content/uploads/2016/10/A322-2017-Physical-Layer-Protocol-1.pdf on Jul. 20, 2020) (Year: 2018).*

Advanced Television Systems Committee (ATSC), ATSC Standard: Scheduler / Studio to Transmitter Link (A/324), Jan. 5, 2018, ATSC (accessed at https://www.atsc.org/wp-content/uploads/2018/01/A324-2018-Scheduler-STL-2-1.pdf on Jul. 20, 2020) (Year: 2018).*

Advanced Television Systems Committee (ATSC), ATSC Candidate Standard: Revision of A/324:2018, Scheduler/Studio to Transmitter Link, Jan. 5, 2018, ATSC (accessed at https://www.atsc.org/wp-content/uploads/2019/06/A324S32-266r56Scheduler-STL-CS.pdf on Jul. 20, 2020) (Year: 2020).*

ATSC, ATSC Recommended Practice: Design of Multiple Transmitter Networks (A/111), Sep. 18, 2009, ATSC (retrieved at https://www.atsc.org/wp-content/uploads/2015/03/Design-of-multiple-transmitter-networks-1.pdf on Jul. 20, 2020) (Year: 2009).*

ATSC, ATSC Standard for Transmitter Synchronization (Document A/110:2011), Apr. 8, 2011, ATSC (retrieved at https://www.atsc.org/wp-content/uploads/2015/03/Transmitter-Synchronization-1.pdf on Jul. 20, 2020) (Year: 2011).*

ATSC, ATSC Standard for Transmitter Synchronization (Document A/111:2009), Sep. 2009, ATSC (retrieved at https://www.atsc.org/wp-content/uploads/2015/03/Transmitter-Synchronization.pdf on Jul. 20, 2020) (Year: 2009).*

Wu et al.,An ATSC DTV receiver with improved robustness to multipath and distributed transmission environments, Mar. 3, 2004, IEEE, IEEE Transactions on Broadcasting, vol. 50, No. 1, pp. 32-41, doi: 10.1109/TBC.2004.823843 (Year: 2004).*

Weiss, Reception considerations for distributed transmission in ATSC systems, May 16, 2005, IEEE, 2005 Digest of Technical Papers (International Conference on Consumer Electronics), pp. 477-478, doi: 10.1109/ICCE.2005.1429924 (Year: 2005).*

Tang et al.; Propagation Characteristics of Distributed Transmission with Two Synchronized Transmitters, May 10, 2006, IEEE, 2006 IEEE 63rd Vehicular Technology Conference, pp. 2932-2936, doi: 10.1109/VETECS.2006.1683405 (Year: 2006).*

Suh et al, A novel data synchronization method for ATSC distributed translator, Sep. 13, 2009, 2009 IEEE 20th International Symposium on Personal, Indoor and Mobile Radio Communications, pp. 2847-2850, doi: 10.1109/PIMRC.2009.5450164 (Year: 2009).*

Erceg, V. et al., "Channel Models for Fixed Wireless Applications," IEEE 802.16.3c-01/29r4, Jul. 26, 2001, 36 pages.

International Search Report and Written Opinion, dated Feb. 5, 2019, for PCT Appl. No. PCT/US2018/059870, 18 pages.

Iwamura, M. et al., "Relay Technology in LTE-Advanced," NTT Docomo Technical Journal, vol. 12, No. 2, 2010, pp. 29-36.

Lecompte, D. et al., "Evolved Multimedia Broadcast/Multicast Service (eMBMS) in LTE-Advanced; Overview and Rel-11 Enhancements," *IEEE Communications Magazine*, vol. 50, No. 11, Nov. 1, 2012 pp. 68-74.

Peters, S.W. et al., "Relay Architectures for 3GPP LTE-Advanced," *EURASIP Journal on Wireless Communications and Networking*, 2009, 14 pages.

Senarath, G. et al., "Multi-hop Relay System Evaluation Methodology (Channel Model and Performance Metric)," IEEE 802.16j-06/013r3, Feb. 19, 2007, 46 pages.

* cited by examiner

| Mod | LDPC Code Rate | | | | | | | | | | | |
|---|---|---|---|---|---|---|---|---|---|---|---|---|
| | 2/15 | 3/15 | 4/15 | 5/15 | 6/15 | 7/15 | 8/15 | 9/15 | 10/15 | 11/15 | 12/15 | 13/15 |
| QPSK | -6.23 | -4.32 | -2.89 | -1.70 | -0.54 | 0.30 | 1.16 | 1.97 | 2.77 | 3.60 | 4.49 | 5.53 |
| 16NUC | -2.73 | -0.25 | 1.46 | 2.82 | 4.21 | 5.21 | 6.30 | 7.32 | 8.36 | 9.50 | 10.57 | 11.83 |
| 64NUC | -0.26 | 2.27 | 4.15 | 5.96 | 7.66 | 8.92 | 10.31 | 11.55 | 12.88 | 14.28 | 15.57 | 17.03 |
| 256NUC | 1.60 | 4.30 | 6.57 | 8.53 | 10.61 | 12.10 | 13.91 | 15.55 | 17.13 | 18.76 | 20.44 | 22.22 |
| 1kNUC | 3.23 | 6.17 | 8.77 | 11.07 | 13.46 | 15.30 | 17.46 | 19.45 | 21.35 | 23.43 | 25.52 | 27.62 |
| 4kNUC | 4.58 | 7.85 | 10.73 | 13.45 | 16.04 | 18.22 | 20.69 | 23.05 | 25.55 | 28.11 | 30.34 | 32.83 |

2102

Options ATSC 3.0 (SNR dB) function of Modulation and Coding Rate

Fig. 21B

| QPSK / LDPC | 2/15 | 1/5 | 4/15 | 1/3 | 2/5 | 7/15 | 8/15 | 3/5 | 2/3 | 11/15 | 4/5 | 13/15 |
|---|---|---|---|---|---|---|---|---|---|---|---|---|
| Capacity (bits/s/Hz) | 0.2667 | 0.4000 | 0.5333 | 0.6667 | 0.8000 | 0.9333 | 1.0667 | 1.2000 | 1.3333 | 1.4667 | 1.6000 | 1.7333 |
| Bit Rate (6MHz) [Mbps] | 1.6 | 2.4 | 3.2 | 4 | 4.8 | 5.6 | 6.4 | 7.2 | 8 | 8.8 | 9.6 | 10.4 |
| C/N (AWGN) [dB] | -5.54031 | -3.72941 | -2.32001 | -1.30001 | -0.3291 | 0.560368 | 1.360287 | 2.191812 | 2.939387 | 3.813314 | 4.7012 | 5.758821 |
| C/N (Rayleigh) [dB] | -5.07031 | -2.9594 | -1.36001 | -0.08001 | 1.1509 | 2.300368 | 3.440287 | 4.691812 | 5.979387 | 7.463314 | 9.1412 | 11.52654 |
| | | | | | | | | | | | | |
| 16 QAM / LDPC | 2/15 | 1/5 | 4/15 | 1/3 | 2/5 | 7/15 | 8/15 | 3/5 | 2/3 | 11/15 | 4/5 | 13/15 |
| Capacity (bits/s/Hz) | 0.5333 | 0.8000 | 1.0667 | 1.3333 | 1.6000 | 1.8667 | 2.1333 | 2.4000 | 2.6667 | 2.9333 | 3.2000 | 3.4667 |
| Bit Rate (6MHz) [Mbps] | 3.2 | 4.8 | 6.4 | 8 | 9.6 | 11.2 | 12.8 | 14.4 | 16 | 17.6 | 19.2 | 20.8 |
| C/N (AWGN) [dB] | -2.15001 | 0.3409 | 1.980287 | 3.149387 | 4.4612 | 5.520668 | 6.510587 | 7.562112 | 8.589687 | 9.743614 | 10.8015 | 12.07912 |
| C/N (Rayleigh) [dB] | -1.14001 | 1.45009 | 3.380287 | 4.779387 | 6.2712 | 7.580668 | 8.950587 | 10.27211 | 11.70969 | 13.23361 | 14.98315 | 17.43912 |
| | | | | | | | | | | | | |
| 64 QAM / LDPC | 2/15 | 1/5 | 4/15 | 1/3 | 2/5 | 7/15 | 8/15 | 3/5 | 2/3 | 11/15 | 4/5 | 13/15 |
| Capacity (bits/s/Hz) | 0.8000 | 1.2000 | 1.6000 | 2.0000 | 2.4000 | 2.8000 | 3.2000 | 3.6000 | 4.0000 | 4.4000 | 4.8000 | 5.2000 |
| Bit Rate (6MHz) [Mbps] | 4.8 | 7.2 | 9.6 | 12 | 14.4 | 16.8 | 19.2 | 21.6 | 24 | 26.4 | 28.8 | 31.2 |
| C/N (AWGN) [dB] | 0.3509 | 2.851812 | 4.6512 | 6.3003 | 7.931112 | 9.301158 | 10.5515 | 11.83303 | 13.1306 | 14.52453 | 15.85241 | 17.32003 |
| C/N (Rayleigh) [dB] | 1.6009 | 4.301812 | 6.5512 | 8.3003 | 10.05211 | 11.55158 | 13.0915 | 14.63303 | 16.20986 | 17.85453 | 19.81241 | 22.44003 |
| | | | | | | | | | | | | |
| 256 QAM / LDPC | 2/15 | 1/5 | 4/15 | 1/3 | 2/5 | 7/15 | 8/15 | 3/5 | 2/3 | 11/15 | 4/5 | 13/15 |
| Capacity (bits/s/Hz) | 1.0667 | 1.6000 | 2.1333 | 2.6667 | 3.2000 | 3.7333 | 4.2667 | 4.8000 | 5.3333 | 5.8667 | 6.4000 | 6.9333 |
| Bit Rate (6MHz) [Mbps] | 6.4 | 9.6 | 12.8 | 16 | 19.2 | 22.4 | 25.6 | 28.8 | 32 | 35.2 | 38.4 | 41.6 |
| C/N (AWGN) [dB] | 2.270287 | 4.7912 | 7.190587 | 8.929687 | 10.9215 | 12.58097 | 14.25089 | 15.81241 | 17.44999 | 19.08391 | 20.7618 | 22.53942 |
| C/N (Rayleigh) [dB] | 3.600287 | 6.7912 | 9.320587 | 11.15869 | 13.3015 | 15.16097 | 16.96089 | 18.64241 | 20.49999 | 22.39391 | 24.5418 | 27.22942 |

FIG. 22

BROADCAST RELAYING VIA COOPERATIVE MULTI-CHANNEL TRANSMISSION

CROSS-REFERENCE TO RELATED APPLICATIONS

The present application claims the benefit of U.S. Provisional Patent Application No. 62/586,055, filed on Nov. 14, 2017, which is hereby incorporated by reference in its entirety.

BACKGROUND

Field

The present disclosure relates to communications systems, including multi-channel single-frequency network broadcast systems.

Related Art

The notion of a broadcast single frequency network (SFN) has been used in terrestrial broadcasting to increase the spectrum efficiency and improve the service quality of a broadcast service. This can be done by using some technique of enabling the same content (data) to be broadcast from multiple transmitters all operating on the same frequency and to produce identical radio frequency (RF) waveforms (coherent signals) exactly at the same instant in time. The challenge is finding a method to provide all transmitters with the same content (data) and necessary signaling, timing information to broadcast on the same frequency without becoming interferers to one another but to improve the received quality of service.

The transmitted RF signals produced by these multiple SFN transmitters are time aligned and coherent, appearing to a receiver as natural RF propagation echoes or reflections in the reception environment, and the receiver then mitigates them as RF echoes emitted from a single transmitter.

The SFN method requires no special processing by the receiver which is agnostic to existence of the SFN. Therefore, multiple techniques can be devised to enable the transmitters to become synchronized and produce coherent RF signals.

SUMMARY

A new hybrid harmonized technique is disclosed which includes the concept of SFN relay nodes using the new Advanced Television Systems Committee (ATSC) 3.0 broadcast standard. The focus is on enabling a Next Gen Broadcast Platform supporting SFN to provision mobile reception and service anywhere along with the more traditional fixed television reception in the living room in a future competitive wireless marketplace.

The present invention describes a new hybrid broadcast SFN system architecture that does not require a Studio-to-Transmitter Link (STL) to send content (data) preprocessed from a central master SFN Gateway node along with timing and metadata directly to every exciter node at each SFN transmitter site. The difference in a relay mode architecture is that the exciter node receives content (data), SFN timing, and/or metadata via an over the air (OTA) RF relay link from another SFN transmitter node directly connected to central Gateway by STL (e.g., fiber, microwave, or the like). The content (data) received from relay is then processed using timing and signaling to create an RF waveform which becomes a coherent broadcast signal from the transmitter site in SFN. Therefore, a harmonized hybrid SFN system architecture is possible using a combination of both traditional STL and OTA RF relays to SFN exciter nodes at transmitter sites using the methods in this disclosure. The SFN relay mode can be technically enabled using some multiplexing technique supported in ATSC 3.0. Time Division Multiplexing (TDM) and Layer Division Multiplexing (LDM) will be described, compared and benefits discussed along with potential use cases. The result of using SFN relay mode is more degrees of freedom for network operator to engineer and locate SFN transmitter sites where they may have the most benefit without constraint of bringing fiber, microwave to each site. There can be an unlimited number of SFN relay transmitter sites with a wide range of effective radiated power (from milliwatts to kilowatts, depending on the implementation) that can be used to improve Quality of Service (QoS) by placing a broadcast signal (SFN) where it is needed to fill in service gaps, serve both indoor and outdoor locations, create hotspots in urban areas and at venues (e.g., stadiums, arenas, or the like) and/or by mounting on existing cellular towers which helps enable new wireless broadcast business models and new services for consumers. Therefore, the SFN relay nodes can result in increased spectrum efficiency and improvement in QoS. This service can be provided by a third party for any combination of broadcasters in a market, much like a Distributed Antenna System (DAS) in 3GPP LTE-A cellular is deployed for mobile network operators (MNO) in market today.

Consequently, improvements in broadcast QoS is essential for Next Gen Broadcasting Platform using ATSC 3.0 to be successful and attract and retain consumers in a highly competitive wireless market. This future is when broadcast signals are received by consumers using mobile receivers anywhere not just in their living rooms using a new broadcast standard such as ATSC 3.0.

A Next Gen Broadcast Platform (NGBP) represents a new broadcast system architecture and paradigm shift that enables broadcast licensees to come together using shared licensed broadcast spectrum resources and a common infrastructure to create a multi-tenant virtualized broadcast cloud model instead of operating traditionally as independent isolated islands. This sharing of spectrum resource and infrastructure can enable cost savings but moreover innovation to remain competitive in a free wireless market.

The Federal Communications Commission (FCC) in the United States is re-thinking broadcast regulations and has encouraged broadcasters to share spectrum and to innovate after the 600 MHz incentive auction completed. Therefore, the SFN Relay node architectures disclosed take advantage of spectrum or channel sharing and a common infrastructure and enables innovation. The FCC has also allowed broadcasters the permission to voluntarily start to use the new ATSC 3.0 standard by the end of 2017.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIGS. 21A and 21B provide possible configurations provided by the ATSC 3.0 physical layer, according to some embodiments.

FIG. 22 and depicts 48 available options for ATSC 3.0 using LDPC short codes and QAM modulation, according to some embodiments.

Figure 1:
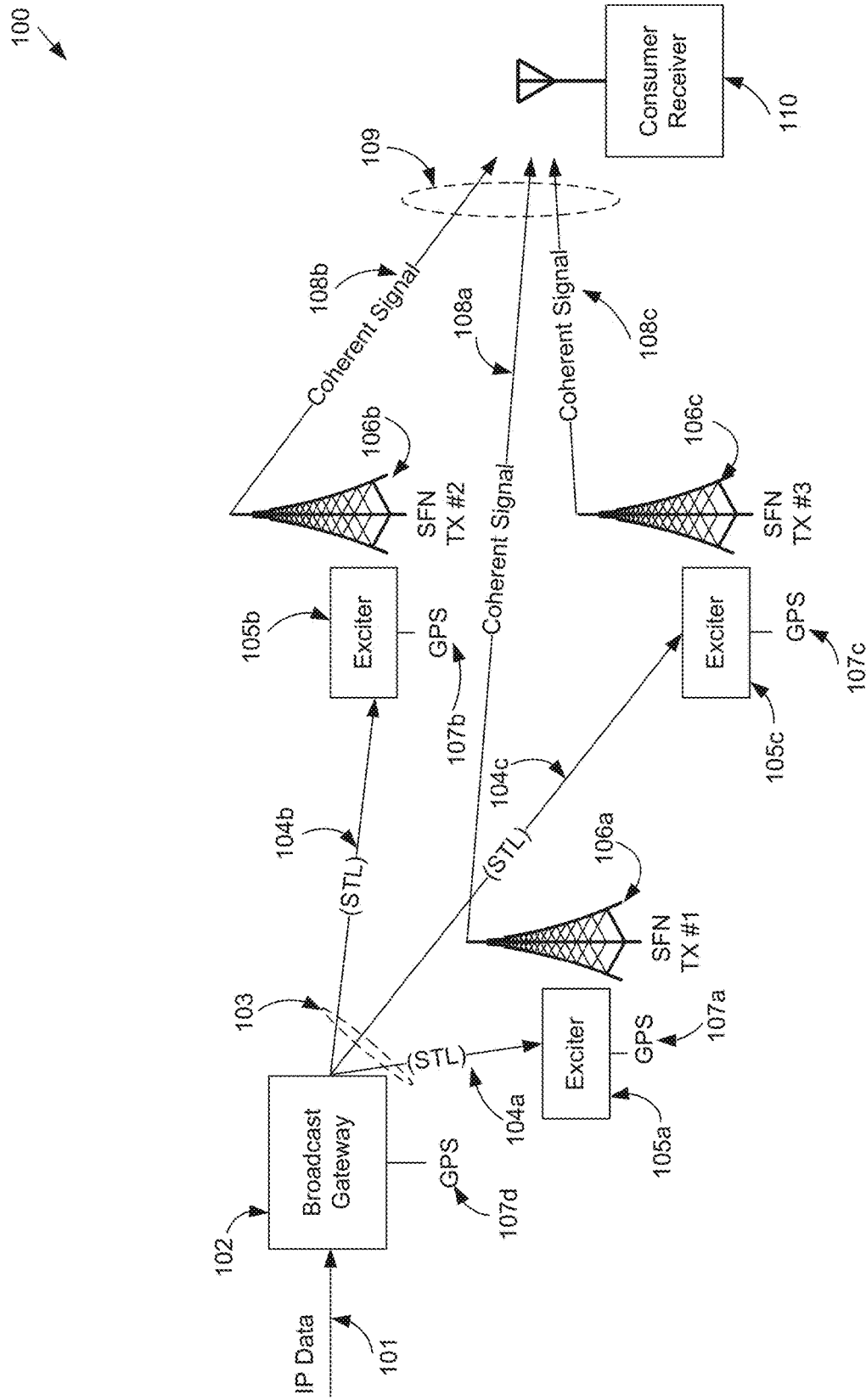
FIG. 1 illustrates an ATSC 3.0 SFN having a Studio to Transmitter Link (STL) between the gateway and each exciter, according to some embodiments.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

It should be appreciated that the following acronyms and abbreviations may be used herein:
ATSC Advanced Television Systems Committee
AWGN Additive White Gaussian Noise
BICM Bit-Interleaved Coded Modulation
dB Decibels
FEC Forward Error Correction
FFT Fast Fourier Transform
GI Guard Interval
GPS Global Positioning System
LDM Layer Division Multiplexing
LDPC Low Density Parity Check
MHz MegaHertz
NFV Network Function Virtualization
OFDM Orthogonal Frequency Division Multiplexing
OTA Over-the-Air
PLP Physical Layer Pipe
QAM Quadrature Amplitude Modulation
QPSK Quadrature Phase Shift Keying
RF Radio Frequency
SDN Software-Defined Networking
SFN Single Frequency Network
SNR Signal-to-Noise Ratio
STL Studio-to-Transmitter Link
TAI International Atomic Time
TDM Time Division Multiplexing
TX Transmitter
VNF Virtual Network Function
Broadcast Single-Frequency Network Architecture In some embodiments, a broadcast SFN 100 may be configured as shown in FIG. 1. The broadcast SFN 100 may include a broadcast gateway 102 that receives IP data 101 and distributes data and control information 103 throughout the broadcast SFN 100. The data and control information 103 distributed by broadcast gateway 102 may include content formatted into physical layer pipes (PLPs), signaling, metadata, SFN timing, and transmission control. In some embodiments, the data and control information 103 conforms to the ATSC 3.0 standard, and in such embodiments the broadcast gateway 102 is an ATSC 3.0 gateway and/or one or more of the exciters 105a-105c are ATSC 3.0 exciters.

The broadcast SFN 100 may also include a plurality of transmitters illustratively suggested by SFN transmitter #1 106a, SFN transmitter #2 106b, and SFN transmitter #3 106c. A broadcast gateway 102 may couple to the transmitters 106a-106c via studio-to-transmitter links (STLs) 104a-104c, respectively. STLs 104a-104c may each include a fiber or a dedicated microwave connection between the gateway 102 and the respective SFN transmitters 106a-

106c. Such fiber or dedicated microwave connections can be expensive and may limit the number or location of SFN transmitters 106a-106c. Each SFN transmitter 106a-106c may include an exciter 105a-105c that processes the data and control information 103 to create an RF waveform suitable for broadcast by the SFN transmitter 106a-106c.

The SFN transmitters 106a-106c wirelessly broadcast identical content on the same frequency. In the illustrated embodiment, the SFN network nodes (including SFN transmitters 106a-106c and gateway 102) have a common time reference 107a-107d available such as the Global Positioning System (GPS) to enable synchronous transmission. For illustrative purposes only, the broadcasts from SFN transmitters 106a-106c are discussed relative to consumer receiver 110. In some embodiments, consumer receiver 110 may be a fixed device such as a television receiver or a desktop computer. In other embodiments, consumer receiver 110 may be a nomadic device such as a tablet computer or laptop computer. In still further embodiments, consumer receiver 110 may be a mobile device such as a mobile phone, automobile-based device, aircraft-based device, etc. Although FIG. 1 illustrates one consumer receiver 110, there is no limit to the number of devices that could receive the signals broadcast from SFN transmitters 106a-106c.

The broadcasts from SFN transmitters 106a-106c arrive at the consumer receiver 110 over paths 108a-108c, respectively. At the consumer receiver 110, the signals on these paths 108a-108c combine to form a single received signal 109. Differences in the lengths of the paths 108a-108c may cause the broadcasts from SFN transmitters 106a-106c to arrive at slightly different times due to reflections caused by the RF propagation environment or non-uniform distances between the SFN transmitters 106a-106c and the consumer receiver 110. To the consumer receiver 110, such differences appear as naturally-occurring echoes of a signal transmitted by a single transmitter. Therefore, the consumer receiver 110 may be agnostic to the broadcast SFN because it is capable of dealing with such echoes without knowledge or consideration of the existence of multiple SFN transmitters 106a-106c. For example, the ATSC 3.0 standard utilizes an orthogonal frequency division multiplexing (OFDM) physical layer with configurable guard interval lengths to handle propagation echoes regardless of their source.

Broadcast SFN Relaying Using Time-Division Multiplexing (TDM)

Figure 2:
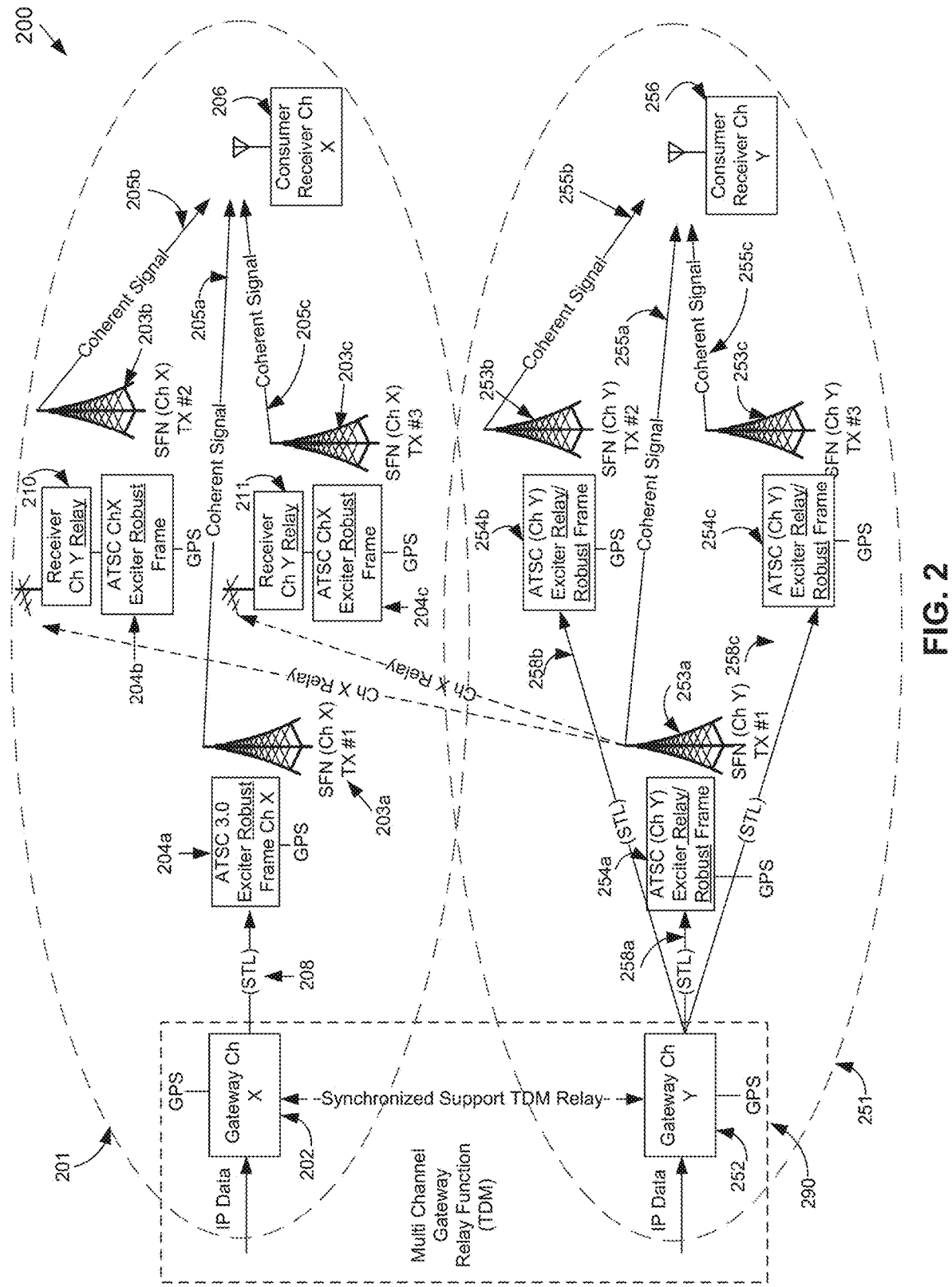
FIG. 2 illustrates an example cooperative multi-channel broadcast system that uses wireless relays instead of STLs to feed a subset of SFN transmitters, according to some embodiments.

The cost and complexity of deploying a separate STL for each SFN transmitter can limit the number and location of SFN transmitters. FIG. 2 illustrates an embodiment of a cooperative multi-channel broadcast system 200 that uses wireless relays instead of STLs to feed a subset of SFN transmitters. In the illustrated embodiment, broadcast system 200 includes two broadcast SFNs, Channel X SFN 201 and Channel Y SFN 251, which broadcast on separate broadcast channels. The Channel Y SFN 251 uses a portion of its Channel Y resources to wirelessly relay information to the Channel X SFN. In this manner, SFN transmitters 203b and 203c can operate without an expensive STL connecting them to the Channel X gateway 202. As discussed further below, the Channel Y SFN transmitters 253a-253c multiplex the relay signal with its own broadcast signal using a time-division multiplexing (TDM) approach, allowing use of a portion of Channel Y to relay Channel X data to Channel X SFN transmitters 203b and 203c.

The cooperative multi-channel broadcast system 200 may include a multi-channel gateway 290 having TDM Relay functionality. The multi-channel gateway 290 is the SFN master node with overall system orchestration responsibility supporting the exciters in both Channel X SFN 201 and Channel Y SFN 251, according to some embodiments. The exciters are considered SFN slave nodes and are connected to the multi-channel gateway 290 either directly via an STL or an over-the-air (OTA) relay link. The multi-channel gateway 290 can be a virtual entity that is centrally located (e.g., in a datacenter or in a cloud center using software-defined networking (SDN) or network function virtualization (NFV)) and contains the Virtual Network Functions (VNFs) of the Channel X gateway 202 and Channel Y gateway 252. Alternatively, multi-channel gateway 290 can be implemented using hardware appliances physically connected together.

Channel Y SFN 251 includes STL communication paths 258a-258c connecting the multi-channel gateway 290 to exciters 254a-254c, respectively. The corresponding SFN transmitters 253a-253c broadcast, on Channel Y, time-aligned coherent signals 255a-255c that are received by a consumer receiver 256 tuned to Channel Y. In this manner, Channel Y SFN 251 operates similarly to broadcast SFN 100 of FIG. 1.

Channel Y SFN 251 is different from broadcast SFN 100 of FIG. 1, however, in that its SFN transmitters 253a-253c broadcast, on Channel Y, a relay signal that is only intended to be decoded by infrastructure receivers in Channel X SFN 201, and not by consumer receiver 256. It accomplishes this relaying functionality by multiplexing the Channel X relay signal with the Channel Y broadcast signal using TDM, as is discussed in detail relative to FIG. 3.

Unlike Channel Y SFN 251, the Channel X SFN 201 has only a single STL communication path 208 that connects the multi-channel gateway 290 to one exciter 204a corresponding to SFN transmitter 203a. Exciters 204b and 204c, in contrast, are coupled to Channel Y receivers 210 and 211, respectively. The Channel Y receivers 210 and 211 receive and decode the transmission from Channel Y SFN transmitters 253a-253c on Channel Y carrying the Channel X relay signal. Although, FIG. 2 illustrates Channel X relay signals from Channel Y SFN transmitter 253a to the Channel Y receivers 210 and 211. Channel Y SFN transmitters 253b and 253c can also transmit Channel X relay signals to the Channel Y receivers 210 and 211. Thus, Channel Y receivers 210 and 211 provide connections between multi-channel gateway 290 and exciters 204b and 204c via the Channel Y SFN transmitters 253a-253c. The Channel X SFN transmitters 203a-203c then broadcast, on Channel X, time-aligned coherent signals 205a-205c that are received by consumer receiver 206 tuned to Channel X.

Figure 3:
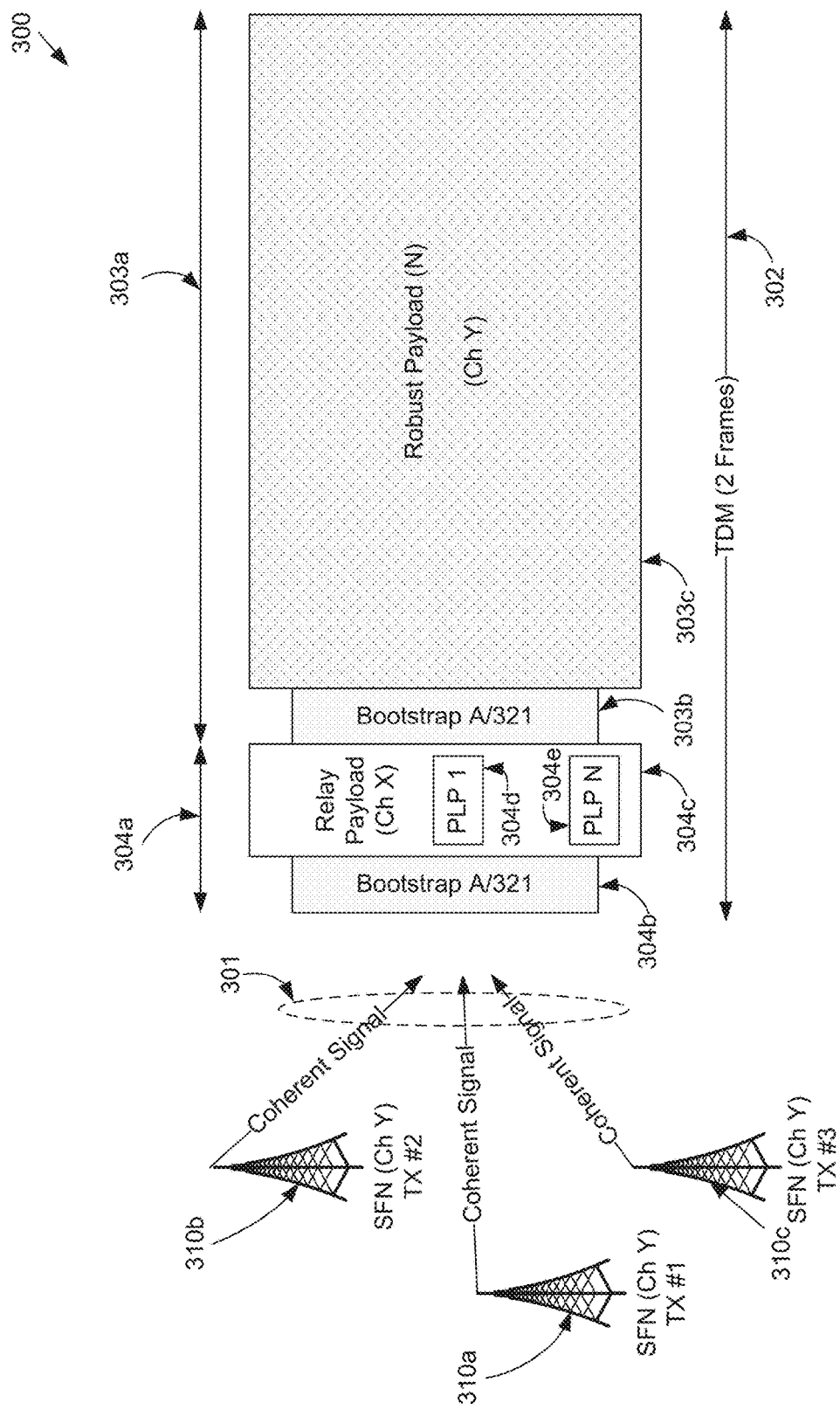
FIG. 3 illustrates an example multi-channel Time Division Multiplexing (TDM) relay transmission from a cooperating SFN, according to some embodiments.

FIG. 3 illustrates an example multi-channel TDM relay transmission 300 from a cooperating SFN broadcasting on Channel Y. In some embodiments, the SFN transmitters 310a-310c may correspond to SFN transmitters 253a-253c in FIG. 2. The SFN transmitters 310a-310c may broadcast two different types of frames that are multiplexed using TDM 302. Specifically, in some embodiments, the SFN transmitters 310a-310c may broadcast a relay frame 304a and a robust frame 303a orthogonally in the time dimension.

The relay frame 304a may comprise a bootstrap 304b and a relay payload 304c, The relay payload 304c comprises a number of PLPs 304d-304e that contain data to be broadcast in future Channel X broadcasts. As such, the relay frame 304a may be intended for reception by Channel Y receivers (e.g., Channel Y receivers 210, 211 in FIG. 2), that are coupled to Channel X SFN transmitters (e.g., 203b, 203c). The relay payload 304c may also comprise signaling, SFN timing, and transmission parameters (not shown) to enable construction and broadcast of the Channel X data by the Channel X SFN transmitters. In this manner, the Channel X payload data contained in PLPs 304d-304e may be distributed to Channel X SFN transmitters without requiring an expensive STL.

The PLPs 304d-304e may be transmitted at a high data rate to ensure that the relay frame 304a occupies a relatively short duration compared to the Channel Y robust frame 303a. This result is desirable to reduce relay overhead caused by the use of Channel Y spectrum for non-Channel Y data. In some embodiments, the relay frame 304a comports with the ATSC 3.0 physical layer standard, which supports a large range of parameters as described below relative to FIG. 22. For example, the ATSC 3.0 physical layer supports a large range of Fast Fourier Transform (FFT) sizes for its orthogonal frequency division multiplexing (OFDM) waveform, as well as variable-rate low-density parity check (LDPC) coding, to enable reception in a broad range of conditions. In some embodiments, the relay payload 304c may be transmitted with the following high-capacity parameters supported by ATSC 3.0:

FFT Size: 32,768
LDPC Code Rate: 13/15
Modulation: 4096 QAM
Guard Interval: 150 μs Using these parameters, the relay payload 304c can be transmitted at 57.2 Mbps in an 6 MHz channel. At this rate, the relay frame 304a may only consume 15% of the TDM frame 302, leaving 85% of TDM frame 302 for independent services on Channel Y. To reliably decode such a high-rate signal, a receiver may require a signal-to-noise ratio (SNR) of 33 dB. Thus, Channel Y relay receivers (e.g., Channel Y receivers 210, 211 in FIG. 2) may have a line-of-sight to the Channel Y SFN transmitters 310a-310c, and may use high-gain directional antennas for reception. Many other values could be selected for transmitting relay payload 304c, and the present example illustrates the current highest possible efficiency for ATSC 3.0 transmissions. The relay transmission parameters would be selected by an orchestration engine (e.g., multi-channel gateway 290 in FIG. 2)

The robust frame 303a may comprise a bootstrap 303b and a robust payload 303c. The robust payload 303c contains content intended for reception by consumer devices tuned to receive Channel Y broadcasts, including independent services such as mobile or terrestrial broadcasts capable with ATSC 3.0. The Channel Y SFN transmitters produce time aligned coherent signals 301.

Figure 4:
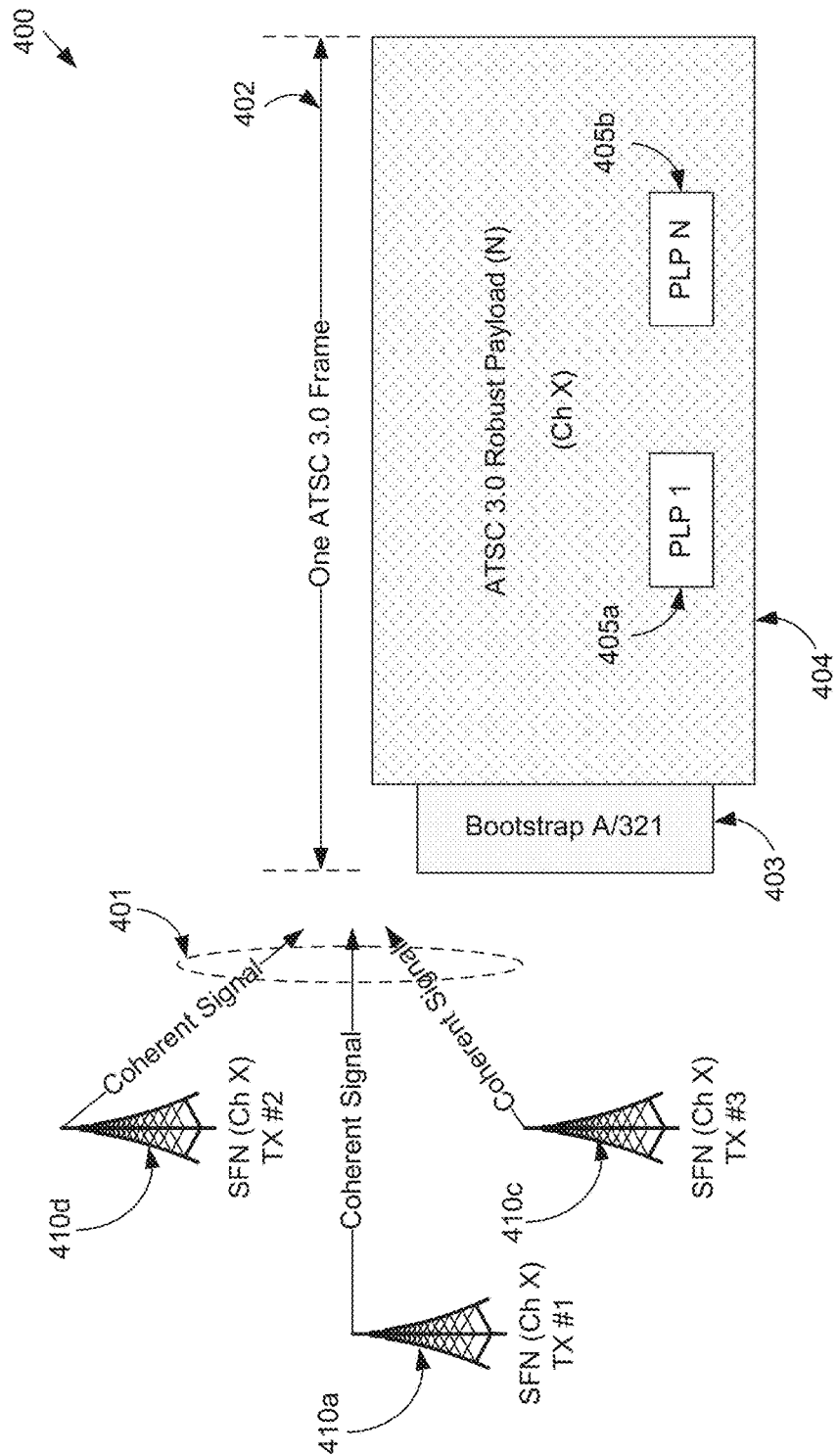
FIG. 4 illustrates an example robust transmission, according to some embodiments.

FIG. 4 illustrates an example robust transmission 400 on Channel X. In some embodiments, the SFN transmitters 410a-410c may correspond to SFN transmitters 203a-203c in FIG. 2. The SFN transmitters 410a-410c may broadcast a robust frame 402 containing data received from Channel Y TDM relay transmissions. Specifically, robust frame 402 may include bootstrap 403 and robust payload 404. The bootstrap 403 may be used by a receiver tuned to Channel X for initial channel synchronization. The bootstrap 403 may also contain low level signaling about the robust payload 404. The robust payload 404 may include a number of PLPs 405a-405b which, in some embodiments, correspond to PLPs 304d-304e in FIG. 3. The PLPs 405a-405b may contain content for mobile services provided by Channel X broadcasts.

Although the PLPs 304d-304e may be relayed at a high data rate to minimize relaying overhead as discussed relative to FIG. 3, the Channel X SFN transmitters 410a-410c may broadcast the PLPs 405a-405b at a lower rate to provide robustness in the transmission. That is, the information relayed from Channel Y to Channel X may be decoded and re-encoded into a more robust waveform suitable for reception by devices without a high SNR or line-of-sight requirement. For example, the ATSC 3.0 physical layer supports a large range of FFT sizes for its OFDM waveform, as well as variable-rate LDPC coding, to enable reception in a broad range of conditions. In some embodiments, the relay payload 304c may be transmitted with the following high-capacity parameters supported by ATSC 3.0:

FFT Size: 8,192
LDPC Code Rate: 7/15
Modulation: 16 QAM
Guard interval: 150 μs

Using these parameters, the robust payload 404 can be transmitted at 8.6 Mbps in an 6 MHz channel. To reliably decode such a robust signal, a receiver may only require an SNR of 5.2 dB. Thus, Channel X relay consumer receivers (e.g., consumer receiver 206 in FIG. 2) need not have a line-of-sight to the Channel X SFN transmitters 410a-410c. Many other values could be selected for transmitting robust payload 404, and the present example illustrates the current highest possible efficiency for AMC 3.0 transmissions. The relay transmission parameters would be selected by an orchestration engine (e.g., multi-channel gateway 290 in FIG. 2)

Figure 5:
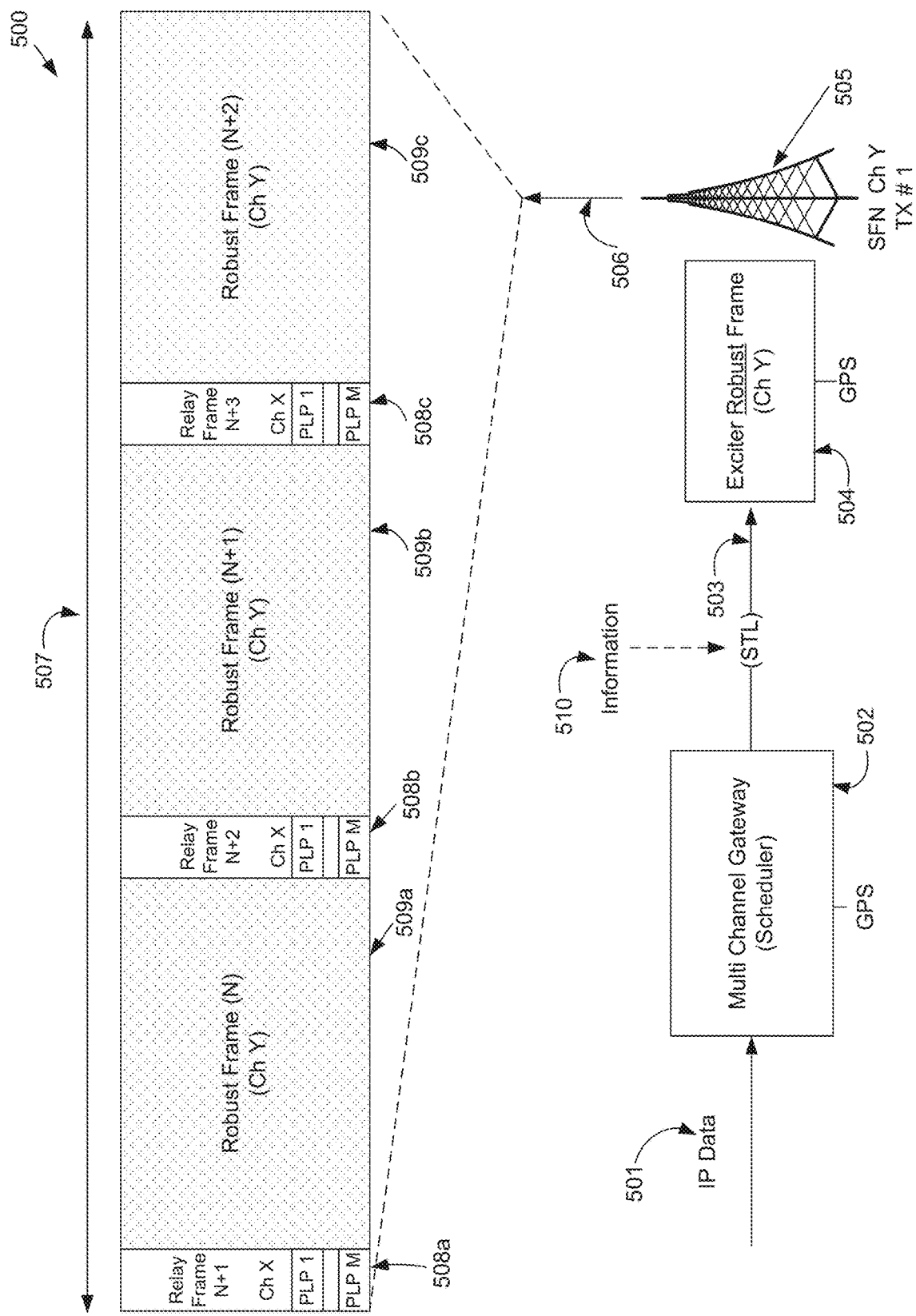
FIG. 5 illustrates a relay transmission of a series of TDM frames, according to some embodiments.

FIG. 5 illustrates a relay transmission 500 of a series of TDM frames 507 that are broadcast 506 from Channel Y SFN transmitter 505 using exciter 504. For simplicity, only one transmitter and exciter are illustrated in FIG. 5. In some embodiments, however, Channel Y SFN transmitter 505 and exciter 504 may respectively correspond to any of Channel Y SFN transmitters 253a-253c and exciters 254a-254c in FIG. 2. In some embodiments, the multi-channel gateway 502 may orchestrate the transmission by receiving IP data 501 including content for Channels X and Y, and providing the exciter 504 with information 510 including signaling, SFN timing, PLPs having content for Channels X and Y, and transmission control over STL 503.

The central orchestration provided by the multi-channel gateway 502 enables the cooperative relaying of Channel X data using Channel Y broadcasts. In some embodiments, the individual frames may be designed such that each frame begins at a specified, pre-determined time. The ATSC 3.0 is one example protocol that provides time-aligned frames. In ATSC 3.0, for example, the start or leading edge of a bootstrap is time aligned by means of TM or GPS time at the air interface of the transmitting antenna.

With the benefit of the centrally located scheduler and orchestration provided by multi-channel gateway 502, and using time aligned frames, the start of the frames 508a-508c and 509a-509c may be deterministically time aligned at the air interface of their respective antennas with respect to TAI or GPS time available at the SFN transmitter 505. The central orchestration of multi-channel gateway 502 allows for broadcasting the Channel X relay frames 508a-508c on Channel Y one frame in advance of when a Channel X robust frame (e.g., robust frame 402 in FIG. 4) will be scheduled and emitted by Channel X SFN transmitters (e.g., SFN transmitters 410a-410c in FIG. 4).

FIG. 5 illustrates the timing of this orchestration with the relay frames 508a-508c having frame numbers N+1, N+2, and N+3, respectively. As is discussed relative to FIG. 7, the start of Channel Y transmission 507 and the start of Channel X transmission are time aligned such that transmission of frame N on Channel X occurs at same time as transmission of relay frame N+1 508a on Channel Y. This advance transmission allows the relay receivers (e,g., Channel Y receivers 210, 211 in FIG. 2) to decode the relayed Channel X PLPs (e.g., PLPs 304d-304e in FIG. 3) and re-encode them into robust PLPs (e.g., PLPs 405a-405b in FIG. 4) for broadcast in a robust frame (e.g., robust frame 402 in FIG. 4). This advance transmission causes a latency of one frame, which in some embodiments corresponds to 250 ms when using a common ATSC 3.0 frame length.

Figure 6:
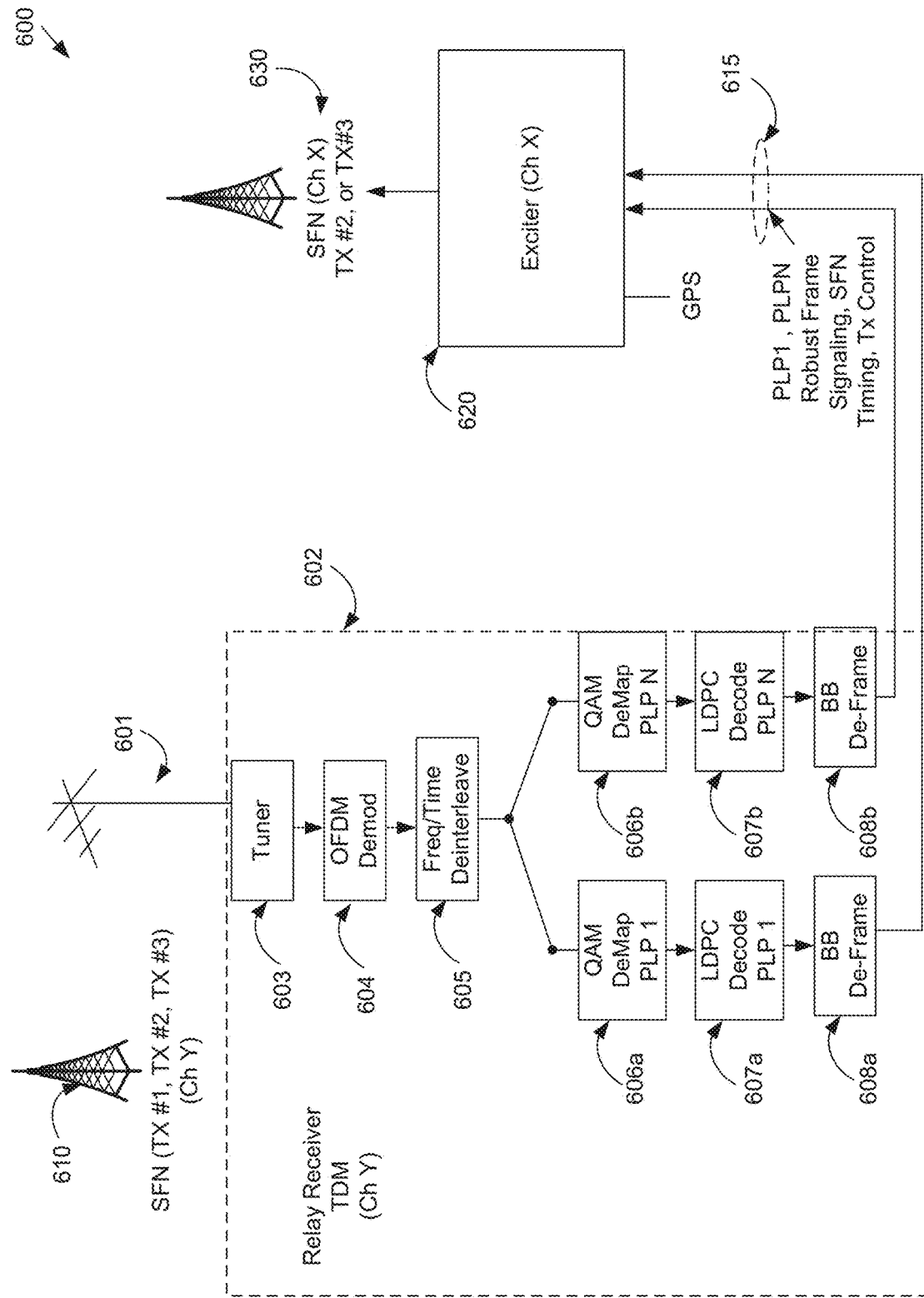
FIG. 6 illustrates details of a relay receiver in the context of a cooperative multi-channel broadcast relay system, according to some embodiments.

FIG. 6 illustrates details of a Channel Y relay receiver 602 in the context of a cooperative multi-channel broadcast relay system 600, according to some embodiments. The Channel Y relay receiver 602 may correspond to Channel Y receivers 210 and 211 of FIG. 2, in some embodiments. Channel Y SFN transmitter 610, which in some embodiments may correspond to one of Channel Y SFN transmitters 253a-253c in FIG. 2, emits a TDM frame on Channel Y. In some embodiments, the emitted TDM frame may correspond to TDM frame 302 in FIG. 3.

An antenna 601 receives the TDM frame on Channel Y. In some embodiments, the antenna 601 is a directional antenna that is aligned toward Channel Y SFN transmitter 610 to ensure a high SNR. In some embodiments the antenna 601 may be configured with a line-of-sight to Channel Y SFN transmitter 601 and receives the required SNR field strength with a fade margin calculated during site engineering.

The Channel Y relay receiver 602 recovers the content, signaling, SFN timing, and transmission control data relayed by the Channel Y SFN transmitter 610. The tuner 603 is tuned to a frequency corresponding to Channel Y and produces a signal ready for digital demodulation and decoding. The OFDM demodulator 604 demodulates the OFDM signal, for example by removing a cyclic prefix, converting the received signal to the frequency domain, and performing frequency-domain equalization. The frequency and time deinterleaver 605 then deinterleaves the demodulated signal in frequency and/or time. Subsequently, the PLPs may be processed in parallel. For example, PLP 1 may be processed using QAM demapper 606a, LDPC decoder 607a, and baseband de-framer 608a, whereas PLP N may be processed in parallel using QAM demapper 606b, LDPC decoder 607b, and baseband de-framer 608b. The discussion of each respective component will therefore be made with regard to PLP 1 without loss of generality towards other PLPs. The QAM demapper 606a demaps the deinterleaved QAM symbols to a bitwise representation, which may constitute hard or soft outputs to the decoder. The LDPC decoder 607a decodes LDPC codewords and produces decoded information bits to the baseband de-framer 608a, which arranges the decoded data to passing to upper layers.

The de-framed information 615 is then passed to the exciter 620 for broadcast on Channel X. The exciter 620 follows the orchestration instructions relayed from Channel Y to construct the broadcast waveform. The exciter 620 uses the SFN timing and the GPS signal to emit the broadcast waveform from the Channel X SFN transmitter 630 at a pre-determined time and substantially simultaneously with broadcasts by other Channel X SFN transmitters (regardless as to whether those other Channel X SFN transmitters were fed by an STL or a Channel Y relay). In some embodiments, the broadcast waveform corresponds to robust frame 402 of FIG. 4.

Figure 7:
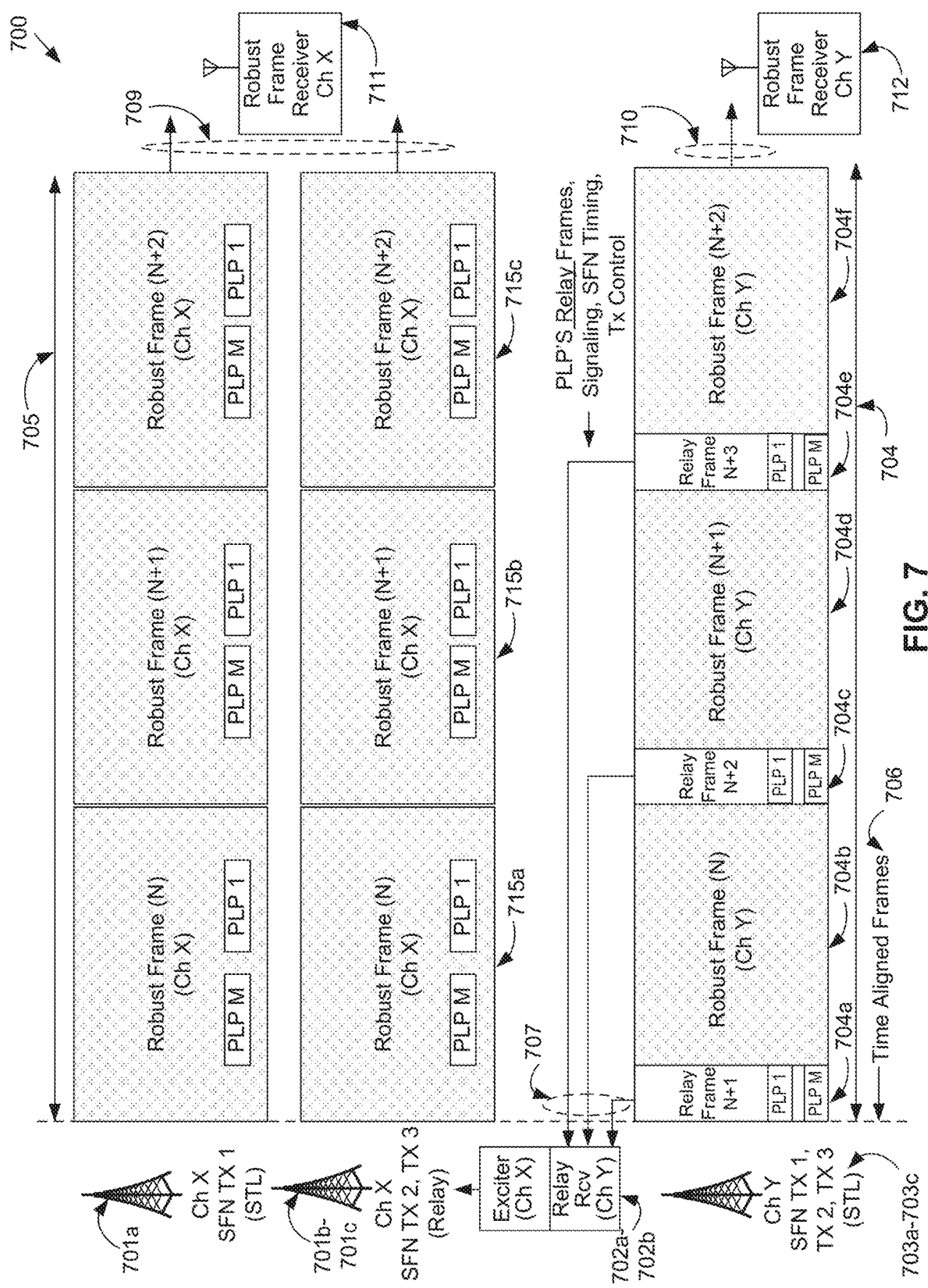
FIG. 7 depicts a timing diagram that compares the timing of transmissions on two different channels in a cooperative multi-channel TDM relay SFN system, according to some embodiments.

FIG. 7 depicts a timing diagram 700 that compares the timing of Channel X transmissions 705 and Channel Y transmissions 704 in a cooperative multi-channel TDM relay SFN system, according to some embodiments. The Channel X transmissions 705 and the Channel Y transmissions 704 are time aligned 706, according to some embodiments. The Channel Y transmission 704 may be transmitted substantially simultaneously from a plurality of Channel Y SFN transmitters 703a-703c. The Channel Y robust frames 704b, 704d, 704f may be received by a Channel Y robust frame receiver 712. Conversely, Channel X relay frames 704a 704c, 704e may be received and decoded by relay receivers 702a-702b, allowing for recovery of PLPs 1-M. The Channel X exciters may re-encode the PLPs 1-M using a robust modulation and coding scheme in a robust frame for later transmission. For example, the PLPs 1-M in relay frame N+1 704a may be re-encoded into Channel X robust frame N+1 715b. The Channel X robust frames are transmitted 709 by the channel X SFN transmitters 701a-701c, and are intended for reception by Channel X robust frame receivers including the illustrated Channel X robust frame receiver 711. Similarly, Channel Y robust frames 704b, 704d, 704f are transmitted 710 by Channel Y SFN transmitters 703a-703c, and are intended for reception by Channel Y robust frame receivers including the illustrated. Channel Y robust frame receiver 712.

Figure 8:
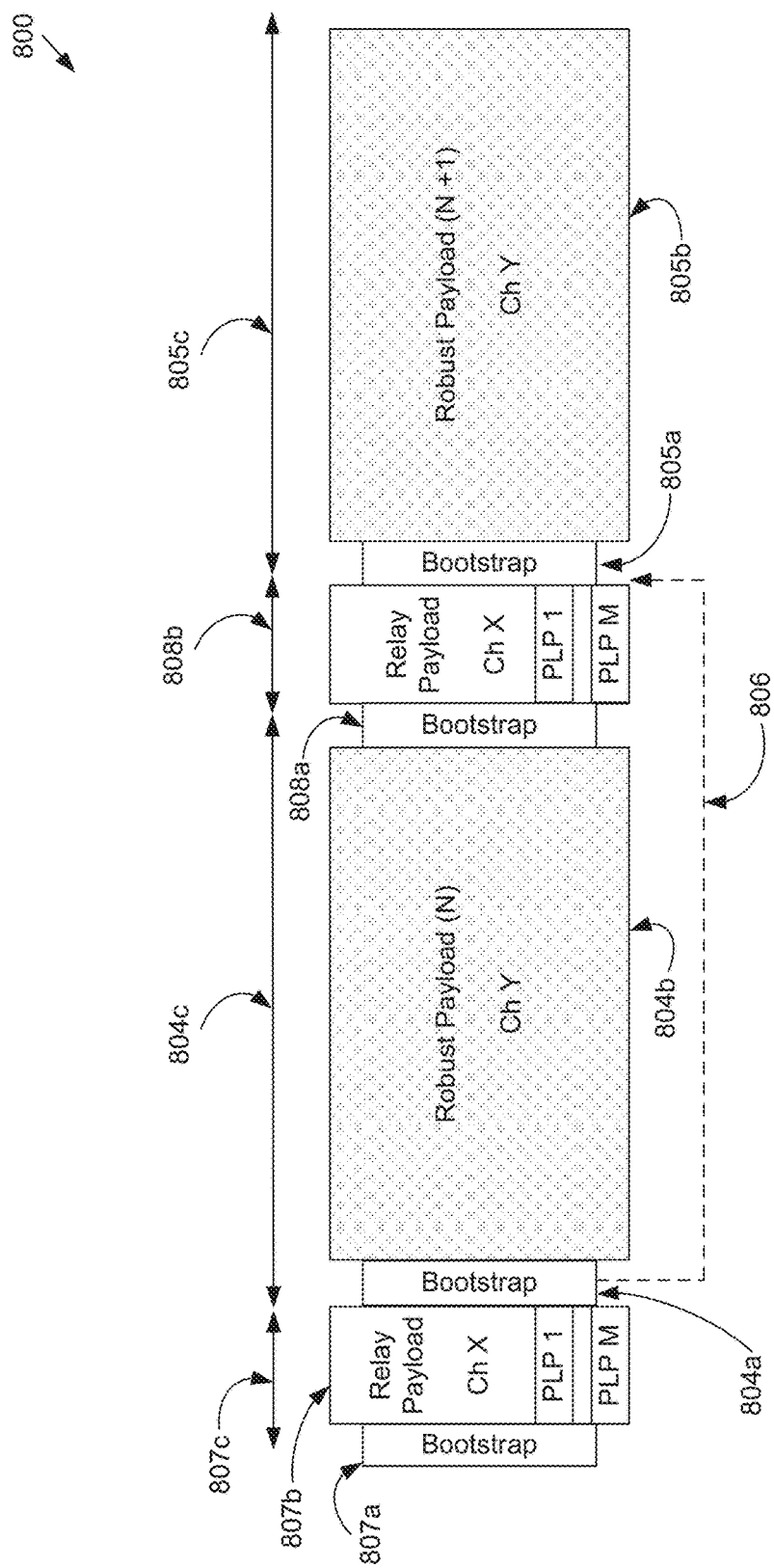
FIG. 8 illustrates a cooperative TDM transmission, according to some embodiments.

FIG. 8 illustrates a Channel Y cooperative TDM transmission 800, according to some embodiments. The Channel Y cooperative TDM transmission 800 may comprise relay frames 807c, 808c time-multiplexed with robust frames 804c, 805c. In some embodiments, each frame 804c, 805c, 807c, and 808c includes a payload 804b, 805c, 807b, and 808b and a bootstrap 804a 805a, 807a, and 808a, respectively. Each payload 804b, 805c, 807b, and 808b is preceded by a bootstrap 804a 805a, 807a, 808a, for example a bootstrap signal complying with the ATSC A/321 protocol. The relay frames 807c, 808c carry Channel X data to be relayed to Channel X SFN transmitters using a professional broadcast relay receiver designed for that purpose. Thus, consumer receivers tuned to Channel Y should not decode relay frames 807c, 808c. In some embodiments, the transmission 800 may utilize mechanisms in the ATSC 3.0 standard to allow receivers to skip decoding of frames such as relay frames 807c, 808c. For example, bootstraps 807a, 808a preceding relay payloads 807b, 808b can both be assigned a major version number that will not be ignored by consumer ATSC 3.0 major version receivers. Other higher layer signaling mechanisms available in ATSC 3.0 may also be used to ensure that a ATSC 3.0 major version consumer receiver tuned to Channel Y does not attempt to access these relay frames. Furthermore, in some embodiments, to ensure the continuous uninterrupted reception of the robust frames by a ATSC 3.0 consumer receiver, the bootstraps 804a 805a can use the A/321 signaling known as min_time_to_next 806 from Table 6.2 of the ATSC 3.0 A/321 standard. This signaling indicates the starting time, in milli-seconds, of the next frame having the same major version as the bootstrap being decoded. Using this parameter in bootstrap 804a for example, enables a receiver to skip 806 over the bootstrap 808a and relay payload 808b as shown, and resume decoding at the start of the next applicable bootstrap 805a corresponding to the next robust payload 805b.

Broadcast SFN Relaying Using Layer-Division Multiplexing (LDM)

Next, techniques of LDM SFN relay modes using a multi-channel cooperative SFN system architecture will be disclosed. The LDM SFN relay mode is a multi-channel SFN cooperative technique for delivering more reliable mobile services with more freedom to install SFN relay transmitters at any geographic location necessary to fill in gaps in service. Such an architecture can serve both indoor and outdoor locations, including urban areas and crowded venues (e.g., stadiums or arenas), by, for example, placing SFN relay transmitter sites on cellular towers. These SFN relay transmitter sites can operate with transmit power levels from, for example, milliwatts to hundreds of kilowatts (depending on the implementation) of effective radiated power (ERP) and are engineered to bring the broadcast SFN signal where it is required to help mitigate the challenges of real world broadcast propagation environments. Therefore, two or more cooperating and fully functioning SFN channels can be used to establish more reliable broadcast mobile service anywhere by means of new relay transmitter sites on the cooperating channels. This is synergistic with reciprocal benefit for the cooperating channels. Such benefits exist in addition to the benefits provided by the TDM SFN relay mode that is used to simply substitute for a STL and establish basic SFN functionality for another channel.

In some embodiments, data may be relayed to SFN transmitters using layer division multiplexing, or LDM. A broadcast transmission system may utilize LDM relaying on its own or in conjunction with TDM relaying described in the previous sections. LDM relaying represents a new broadcast system architecture and paradigm shift that enables broadcast licensees to come together using their licensed broadcast spectrum resources and a common infrastructure to create a new multi-tenant virtualized broadcast cloud model instead of operating traditionally as independent isolated islands. This cooperative sharing of spectrum resources and infrastructure can enable cost savings and increase the spectrum efficiency, and may enable innovation for next generation broadcast technologies to remain competitive in a future mobile wireless market. Although described with respect to SFN mobile services, the disclosed techniques can be applied to other services including fixed broadcast services. In some embodiment, the disclosed techniques can also be applied to ultra-robust mobile portable devices.

Figure 9:
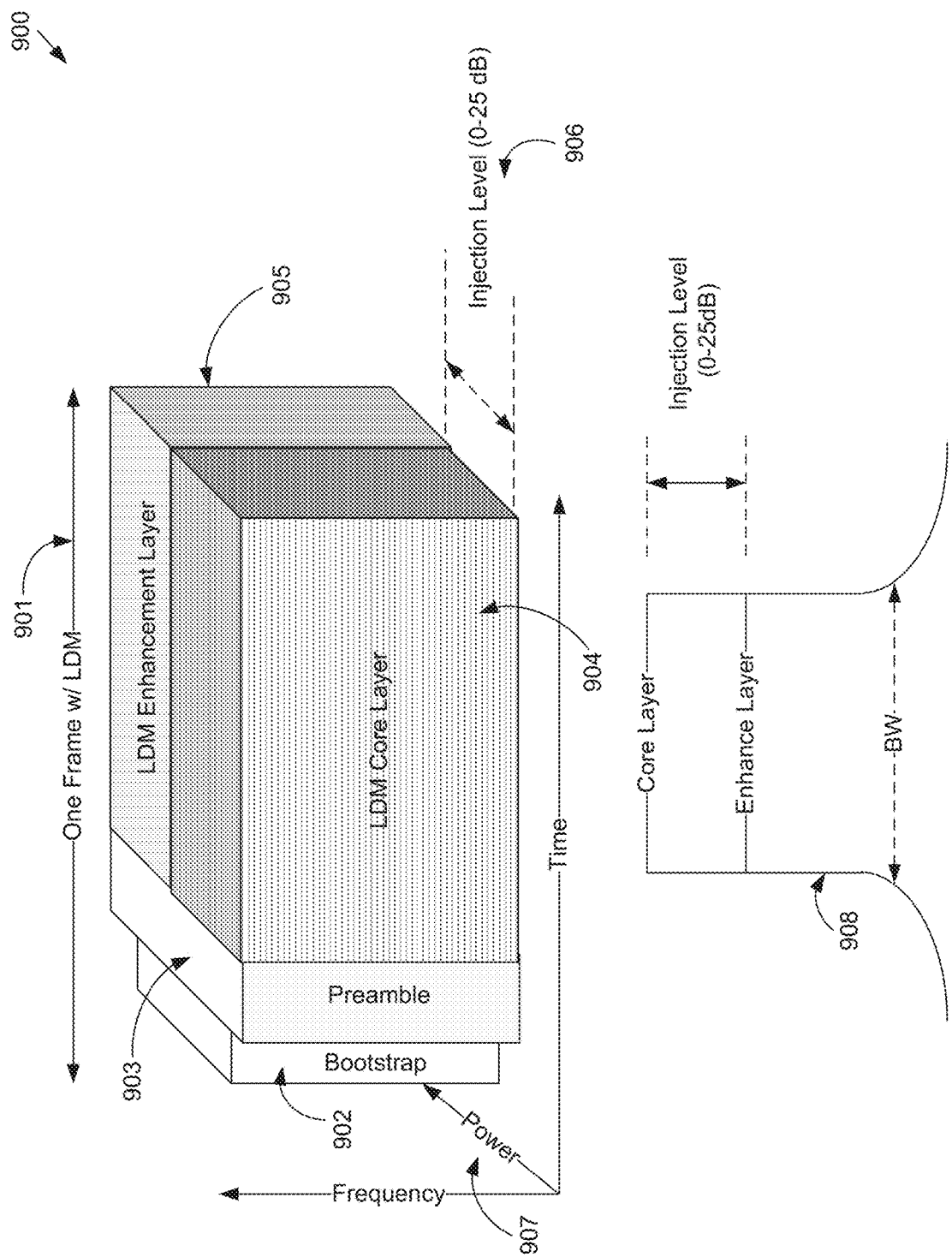
FIG. 9 depicts an example of an Layer Division Multiplexing (LDM) concept via an LDM frame illustrated in three dimensions, according to some embodiments.

FIG. 9 depicts the LDM concept 900 via an LDM frame 901 illustrated in three dimension (time, frequency, and power), according to some embodiments. LDM frame 901 may include a bootstrap 902 followed by a preamble 903. The preamble 903 may be followed by a payload portion of the frame utilizing LDM. The payload portion may include an LDM core layer 904 and an LDM enhancement layer 905. The two LDM layers 904, 905 may be transmitted simultaneously in time and frequency and thus interfere with each other. However, the LDM core layer 904 may be transmitted at a higher power than LDM enhancement layer 905. As illustrated in the power spectrum plot 908, the LDM core layer 904 may be transmitted with as much as 25 dB more power than the LDM enhancement layer 905, according to some embodiments. The difference in transmission power between LDM core layer 904 and LDM enhancement layer 905 may be referred to as the injection level 906. Although a range of 0-2.5 dB is shown for the injection level, the embodiments of this disclosure are not limited to this range and other values of the injection level can be used.

A conventional non-LDM receiver may be able to receive and decode the LDM core layer 904 without knowledge of the existence of LDM enhancement layer 905. For such a receiver, the LDM enhancement layer merely appears as noise. For example, assuming a 10 dB injection level 906, a receiver observing an SNR of 15 dB for the transmitted signal may only observe an effective SNR of 10 dB when decoding the LDM core layer 904 due to the interference caused by the LDM enhancement layer 905. The injection level 906 may therefore be chosen to account for such effects, allowing non-LDM receivers to observe a high enough SNR to sufficiently receive the LDM core layer 904 without knowledge of LDM enhancement layer 905.

A high injection level 906 allows an LDM-compatible receiver with a high SNR to employ successive interference cancellation to decode both LDM layers 904, 905. Specifically, a receiver with a high SNR could decode the LDM core layer 904, subtract the LDM core layer 904 from its received signal, and then decode the LDM enhancement layer 905. This process is further discussed below relative to FIG. 12.

An LDM-compatible receiver with a moderate SNR may only be able to decode LDM core layer 904. For example, assuming an injection level 906 of 10 dB, a receiver observing a signal with a 10 dB SNR for the LDM core layer 904 will have an SNR of 0 dB for the LDM enhancement layer 905. Such a receiver may be able to decode the LDM core layer 904, but may be unable to decode the LDM enhancement layer 905.

Defining IL as the injection level 906 in dB, $SNR_{CL}$ as the received SNR of the core layer relative to ambient noise, and $SNR_{EL}$ as the received SNR of the enhancement layer relative to ambient noise, the effective SNR for the LDM core layer 904 can be calculated as $$SNR_{eff,CL} = 10\log_{10}\left(\frac{(1+10^{IL/10}) \times 10^{SNR_{CL}/10}}{10^{IL/10} - 10^{SNR_{CL}/10}}\right)$$

and the effective SNR for the LDM enhancement layer 905 can be calculated as $$SNR_{eff,EL} = 10\log_{10}((1+10^{IL/10}) \times 10^{SNR_{EL}/10}).$$

These three parameters and two equations may be used to design the LDM transmissions disclosed below.

The illustrated LDM concept is a form of superposition coding and has been adopted in the ATSC 3.0 physical layer. The LDM method enables different services and supportive signaling, each constituted by their own respective PLPs, to be separated into two discrete layers 904, 905. These layers are super positioned in the power domain 907 and share the same time and frequency OFDM resources at the same instant thereby increasing the spectral efficiency and enabling new uses. The ATSC 3.0 physical layer standard A/322 specifies LDM as a baseline technology that is expected to be supported in consumer ATSC 3.0 receivers for fixed service uses.

Figure 10:
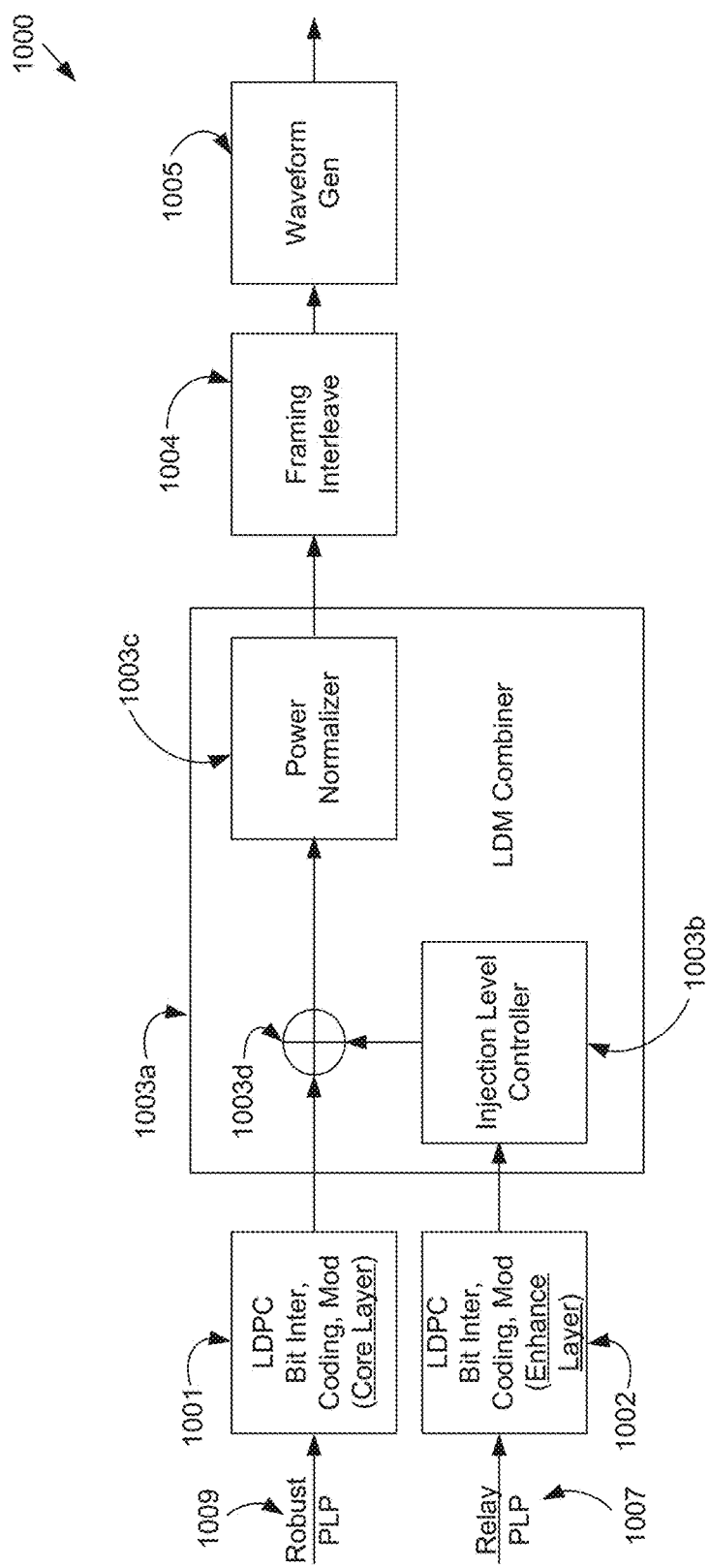
FIG. 10 depicts an exemplary physical layer block diagram showing inclusion of LDM for relay transmissions, according to some embodiments.

FIG. 10 depicts a physical layer block diagram of system 1000 showing inclusion of LDM for relay transmissions, according to some embodiments. System 1000 can be implemented in the Channel Y SFN transmitters 253a-253c of FIG. 2, in some examples. Specifically, a relay PLP 1007 may be used as an LDM enhancement layer on top of the robust PLP 1009 transmitted as an LDM core layer. Robust PLPs 1009 enter the core layer BICM block 1001, and relay PLPs 1007 enter the enhancement layer BICM block 1002. The modulation and LDPC coding for these BICM blocks 1001, 1002 may be selected from a plurality of options. For example, the ATSC 3.0 physical layer provides 72 options as discussed relative to FIG. 22. The output symbols of both BICM blocks 1001, 1002 may enter the LDM combiner block 1003a, which may contain an injection level controller 1003b, power normalizer 1003c, and combiner 1003d, The combiner 1003d combines the LDM core layer and the LDM enhancement layer, for example by adding modulation symbols, to produce combined LDM symbols. The power normalizer 1003c normalizes the combined LDM symbols to equal the power of non-LDM symbols (not shown) in the broadcast. Following LDM combiner block 1003a, the combined LDM symbols may be sent to the framing and interleaving block 1004 and then to waveform generation block 1005. In these blocks 1004, 1005, the combined LDM symbols may be treated as any other symbols in the transmission system.

Figure 11:
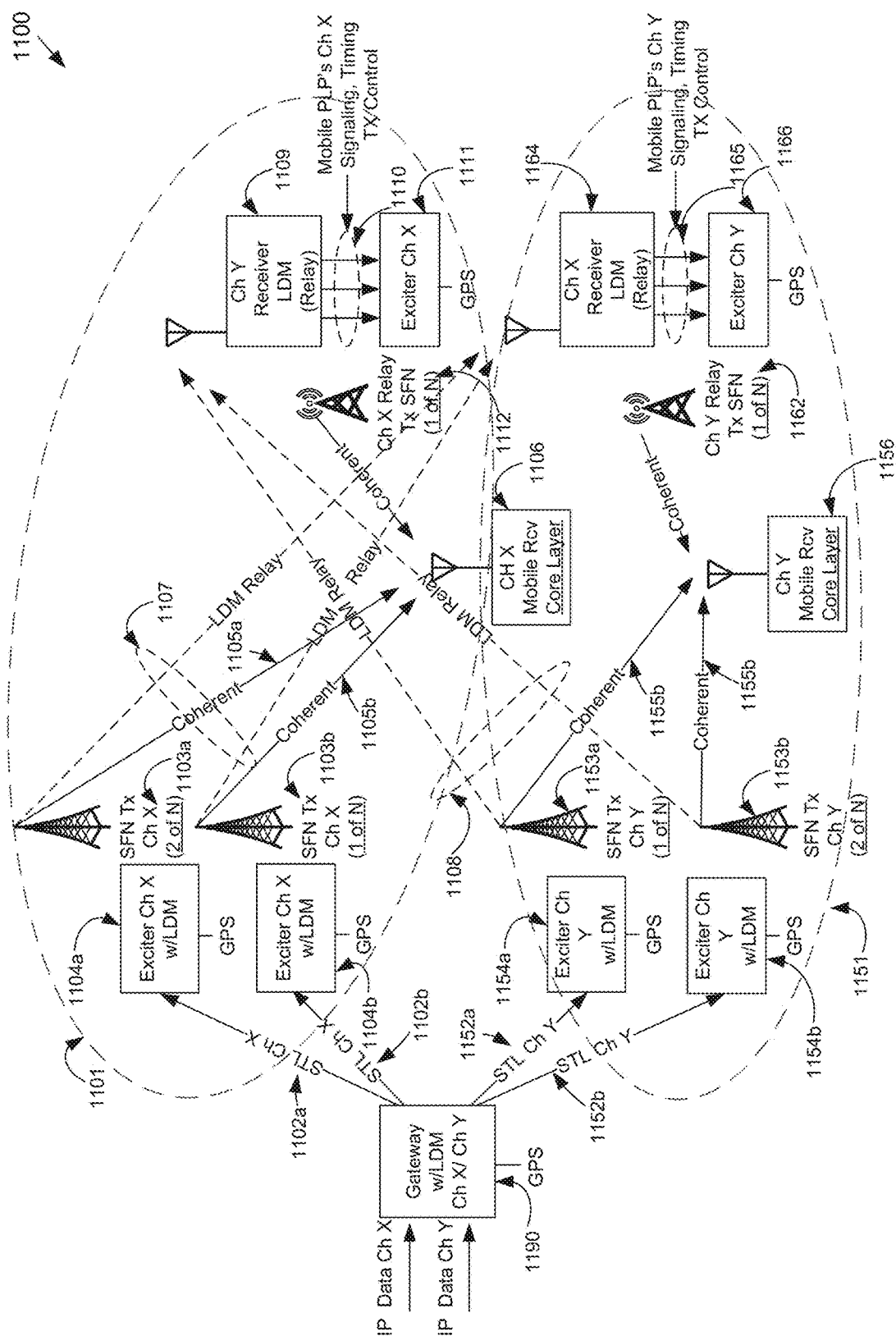
FIG. 11 illustrates an example of a cooperative LDM multi-channel broadcast system that uses wireless relays instead of STLs to feed a subset of SFN transmitters, according to some embodiments.

FIG. 11 illustrates a cooperative LDM multi-channel broadcast system 1100 that uses wireless relays instead of STLs to feed a subset of SFN transmitters, according to some embodiments. In the illustrated embodiment, broadcast system 1100 includes two broadcast SFNs, Channel X SFN 1101 and Channel Y SFN 1151, which broadcast on separate broadcast channels. The operation of both SFNs 1101, 1151 may be centrally orchestrated by multi-channel gateway 1190. In some embodiments, this cooperative orchestration may be used to enable more degrees of freedom and efficiency in the placement of SFN relay transmitters on either channel to improve the quality of service for ATSC 3.0 mobile services.

In some embodiments, the Channel X SFN transmitters 1103a-1103b, Channel Y SFN transmitters 1153a-1153b, and the multi-channel gateway 1190 have a GPS or TAI reference available enabling synchronous operation. The multi-channel gateway 1190 supports an LDM SFN relay function and accepts the two independent input data streams (e.g., the mobile content) for cooperating Channels X and Y. The multi-channel gateway 1190 may preprocess this input data and may communicate over STLs 1102a, 1102b, 1152a, 1152b, the data PLPs, required signaling, and SFN timing for each respective channel.

The Channel Y SFN 1151 uses the enhancement layer of Channel Y LDM transmissions to wirelessly relay information to the Channel X SFN 1101. In this manner, Channel X SFN relay transmitter 1112 can operate without an expensive STL connecting it to the gateway 1190. Conversely, Channel X SFN 1101 uses the enhancement layer of Channel X LDM transmission to wirelessly relay information to the Channel Y SFN 1151. In this manner, Channel Y SFN relay transmitter 1162 can operate without an expensive STL connecting it to the gateway 1190. As discussed further below, the Channel Y SFN transmitters 1153a, 1153b multiplex the Channel X relay signal with their own broadcast signal using LDM, and the Channel X SFN transmitters 1103a, 1103b multiplex the Channel Y relay signal with their own broadcast signal using LDM.

The cooperative LDM multi-channel broadcast system 1100 may include a multi-channel gateway 1190 having LDM Relay functionality. The multi-channel gateway 1190 is the SFN master node with overall system orchestration responsibility supporting the exciters in both Channel X SFN 1101 and Channel Y SFN 1151. The exciters are considered SFN slave nodes and are coupled to the multi-channel gateway 1190 either directly via an STL or an over-the-air (OTA) relay link.

Channel Y SFN 1151 includes STL communication paths 1152a, 1152b connecting the multi-channel gateway 1190 to exciters 1154a 1154b, respectively. The corresponding SFN transmitters 1153a, 1153b broadcast, on Channel Y, time-aligned coherent signals 1155a, 1155b that are received by a consumer receiver 1156 tuned to Channel Y. Channel Y SFN transmitters 1153a, 1153b also broadcast, on Channel Y, a relay signal that is only intended to be decoded by infrastructure receivers in Channel X SFN 1101, and not by consumer receiver 1156. It accomplishes this relaying functionality by multiplexing the Channel X relay signal with the Channel Y broadcast signal using LDM.

Similar to Channel Y SFN 1151, the Channel X SFN 1101 includes STL communication paths 1102a, 1102b connecting the multi-channel gateway 1190 to exciters 1104a 1104b, respectively. The corresponding Channel X SFN transmitters 1103a, 1103b broadcast, on Channel X, time-aligned coherent signals 1105a, 1105b that are received by a consumer receiver 1106 tuned to Channel X. Channel X SFN transmitters 1103a, 1103b also broadcast, on Channel X, a relay signal that is only intended to be decoded by infrastructure receivers in Channel Y SFN 1151, and not by consumer receiver 1106. It accomplishes this relaying functionality by multiplexing the Channel Y relay signal with the Channel X broadcast signal using LDM.

Although FIG. 11 illustrates cooperation among both Channel X SFN 1101 and Channel Y SFN 1151, in some embodiments, use of a single cooperative channel is possible. For example, in some embodiments, Channel X SFN 1101 operates in a very high frequency (VHF) band designed for fixed service delivery. The Channel X SFN 1101 can use the LDM enhancement layer for fixed services to consumer receivers, and can use the LDM core layer for relaying to the Channel Y SFN 1151 operating in an ultra-high frequency (UHF). The Channel Y SFN 1151, in turn, may provide mobile services using only the core layer i.e., without LDM. Note that in such embodiments, there is no reciprocal cooperation from Channel Y SFN 1151 to Channel X SFN 1101.

Figure 12:
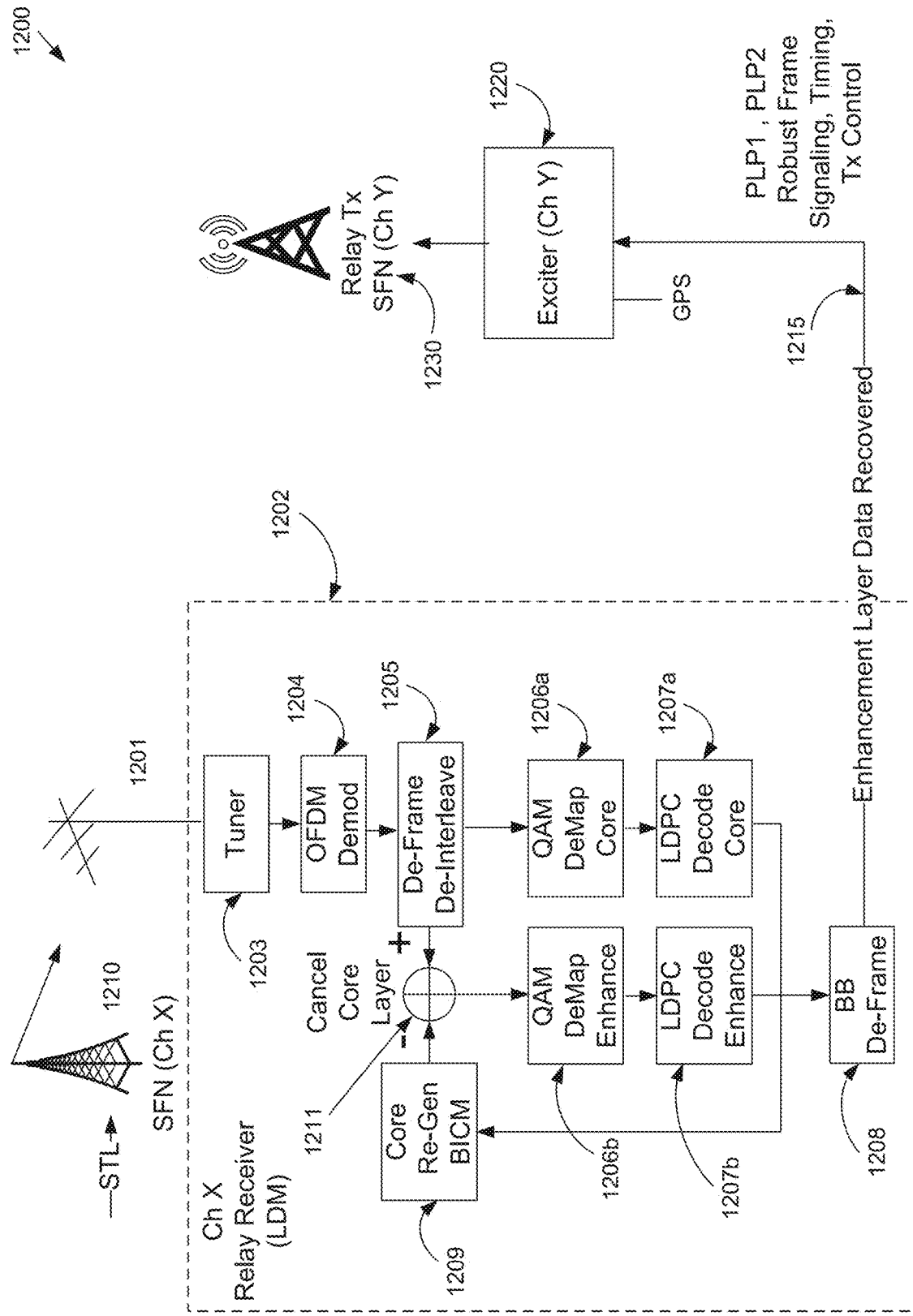
FIG. 12 illustrates details of a relay receiver in the context of a cooperative multi-channel LDM broadcast relay system, according to some embodiments.

FIG. 12 illustrates a Channel X relay receiver 1202 in the context of a cooperative multi-channel broadcast relay system 1200, according to some embodiments. Channel X SFN transmitter 1210, which in some embodiments may correspond to one of Channel X SFN transmitters 1103a, 1103b in FIG. 11, emits an LDM frame on Channel X. In some embodiments, the emitted LDM frame may correspond to LDM frame 901 in FIG. 9. The LDM frame transmitted by the Channel X SFN transmitter 1210 may correspond to the LDM frame 1107 transmitted by one or more of the Channel X SFN transmitters 1103a, 1103b of FIG. 11.

An antenna 1201 receives the LDM frame on Channel X. In some embodiments, the antenna 1201 is a directional antenna that is aligned toward Channel X SFN transmitter 1210 to ensure a high SNR. In some embodiments the antenna 1201 may be configured with a line-of-sight to Channel X SFN transmitter 1201 and receives the required SNR field strength to decode the transmitted LDM enhancement layer with a fade margin calculated during site engineering.

The relay receiver 1202, which in some embodiments may correspond to the Channel X relay receiver 1164 in FIG. 11, recovers the content, signaling, SFN timing, and transmission control data relayed by the Channel X SFN transmitter 1210. The tuner 1203 is tuned to a frequency corresponding to Channel X and produces a signal ready for digital demodulation and decoding of the LDM core layer. The OFDM demodulator 1204 demodulates the OFDM signal, for example by removing a cyclic prefix, converting the received signal to the frequency domain, and performing frequency-domain equalization. The frequency and time deinterleaver and de-framer 1205 then deinterleaves the demodulated signal in frequency and/or time and de-frames the signal.

The layers are then processed in series. First, the LDM core layer is processed by core QAM demapper 1206a and core LDPC decoder 1207a. Similar to the QAM demappers discussed above relative to FIG. 6, the QAM demappers 1206a, 1206b demap the deinterleaved QAM symbols to a bitwise representation, which may constitute hard or soft outputs to the decoder. Similar to the LDPC decoders discussed above relative to FIG. 6, the LDPC decoders 1207*a*, 1207*b* decode LDPC codewords and produce uncoded information bits.

Note that the relay receiver 1202 has no interest in the actual content of the core layer and thus does not pass the decoded content to a baseband de-framer such as baseband de-framer 1208. However, the relay receiver 1202 decodes the LDM core layer in order for the relay receiver 1202 to decode the LDM enhancement layer, which contains the information it requires. Specifically, the relay receiver 1202 may feed the decoded core information to a core regeneration block 1209, which re-encodes and re-maps the core layer information into a noise-free and interference-free form. The regenerated signal represents an estimate of the contribution of the LDM core layer on the received signal. Thus, the relay receiver 1202 subtracts 1211 this contribution from the output of the de-interleaver and de-framer 1205. Assuming the regeneration is an accurate representation of the LDM core layer contribution to the signal, the output of this subtraction 1211 is simply the LDM enhancement layer and noise.

Relay receiver 1202 may then feed the output of the subtraction 1211 to the enhancement QAM demapper 1206*b* and enhancement LDPC decoder 1207*b*. The output of the enhancement LDPC decoder 1207*b* is fed into baseband de-framer 1208, which produces the recovered enhancement layer data.

The de-framed information 1215 is then passed to the exciter 1220 for broadcast on Channel Y. In some embodiments, the de-framed information 1215 may correspond to the information 1165 in FIG. 11. Also, the exciter 1220 may correspond to Channel Y exciter 1166 of FIG. 11. In some embodiments, the information may be broadcast by SFN transmitter on an LDM core layer in Channel Y. The exciter 1220 follows the orchestration instructions relayed from Channel X to construct the broadcast waveform. The exciter 1220 uses the SFN timing and the GPS signal to emit the broadcast waveform from the Channel Y SFN relay transmitter 1230 at a pre-determined time and substantially simultaneous to broadcasts by other Channel Y SFN transmitters (regardless as to whether those other Channel Y SFN transmitters were fed by an STL or a Channel X relay). For example, the relay receiver 1202 and/or the exciter 1220 can include a timing circuit configured to control the timing of the broadcasts from the Channel Y SFN relay transmitter 1230. The Channel Y SFN relay transmitter 1230 may correspond to Channel Y SFN relay transmitter 1162 of FIG. 11.

Although FIG. 12 is discussed with respect to a Channel X SFN transmitter, a Channel X relay receiver, a Channel Y exciter, and a Channel Y SFN relay transmitter, the embodiments of this disclosure can similarly apply to LDM frame 1108 transmitted by one or more of corresponding Channel Y SFN transmitters 1153*a*, 1153*b*, the Channel Y relay receiver 1109, the information 1110, the Channel X exciter 1111, and the Channel X SFN relay transmitter 1112 of FIG. 11.

Figure 13:
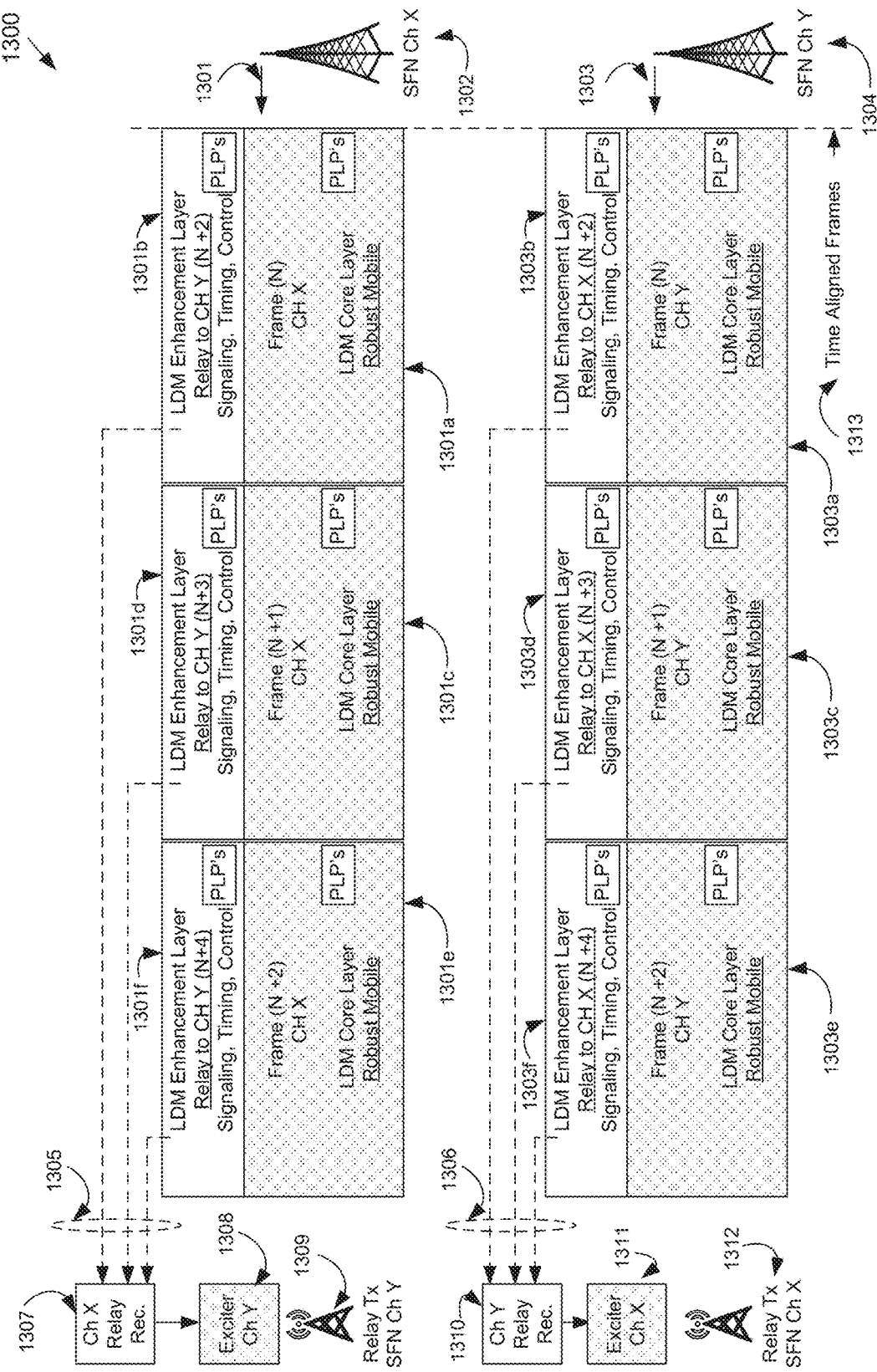
FIG. 13 depicts a timing diagram that compares the timing of transmissions on two channels in a cooperative multi-channel LDM relay SFN system, according to some embodiments.

FIG. 13 depicts a timing diagram 1300 that compares the timing of Channel X transmissions 1301 and Channel Y transmissions 1303 in a cooperative multi-channel LDM relay SFN system, according to some embodiments. The Channel Y transmission 1303 may be transmitted substantially simultaneously from a plurality of Channel Y SFN transmitters, although only Channel Y SFN transmitter 1304 is illustrated in FIG. 13. The Channel Y robust payloads 1303*a*, 1303*c*, 1303*e* may be transmitted on an LDM core layer and may be received by a Channel Y mobile receiver (not shown). Conversely, Channel Y relay payloads 1303*b*, 1303*d*, 1303*f* may be transmitted on an LDM enhancement layer and received 1306 and decoded by Channel Y relay receiver 1310, allowing for recovery of relayed PLPs. The Channel X exciter 1311 may re-encode the relay PLPs in LDM as an core layer in subsequent frames for broadcast by Channel X SFN relay transmitter 1312 and reception by a Channel X mobile receiver (not shown). For example, the PLPs in LDM enhancement layer 1303*b* of frame N may be re-encoded into Channel X LDM core layer 1301*e* transmitted in frame N+2, Channel X SFN relay transmitter 1312 may broadcast the core layer mobile frames as a coherent SFN signal substantially simultaneously as other Channel X SFN transmitters (not shown) using GPS or TAI time references and as indicated by the SFN timing information signaled within the relayed information in Channel Y enhancement layer 1303*b*, 1303*d*, 1303*f*. Note that in some embodiments the Channel X SFN transmitter 1312 does not transmit an LDM enhancement layer for relaying, as such transmissions are performed by Channel X SFN transmitters having an STL connection to the multi-channel gateway.

Similarly, the Channel X transmission 1301 may be transmitted substantially simultaneously from a plurality of Channel X SFN transmitters, although only Channel X SFN transmitter 1302 is illustrated in FIG. 13. The Channel X robust payloads 1301*a*, 1301*c*, 1301*e* may be transmitted on an LDM core layer and may be received by a Channel X mobile receiver (not shown). Conversely, Channel X relay payloads 1301*b*, 1301*d*, 1301*f* may be transmitted on an LDM enhancement layer and received 1305 and decoded by Channel X relay receiver 1307, allowing for recovery of relayed PLPs. The Channel Y exciter 1308 may re-encode the relay PLPs as an LDM core layer in subsequent frames for broadcast by Channel Y SFN relay transmitter 1309 and reception by a Channel X mobile receiver (not show). For example, the PLPs in LDM enhancement layer 1301*b* of frame N may be re-encoded into Channel Y LDM core layer 1303*e* transmitted in frame N+2. Channel Y SFN relay transmitter 1309 may broadcast the core layer mobile frames as a coherent SFN signal substantially simultaneously as other Channel Y SFN transmitters (not shown) using GPS or TAI time references and as indicated by the SFN timing information signaled within the relayed information in Channel X enhancement layer 1301*b*, 1301*d*, 1301*f*. Note that in some embodiments the Channel Y SFN transmitter 1309 does not transmit an LDM enhancement layer for relaying, as such transmissions are performed by Channel Y SFN transmitters having an STL connection to the multi-channel gateway.

Figure 14:
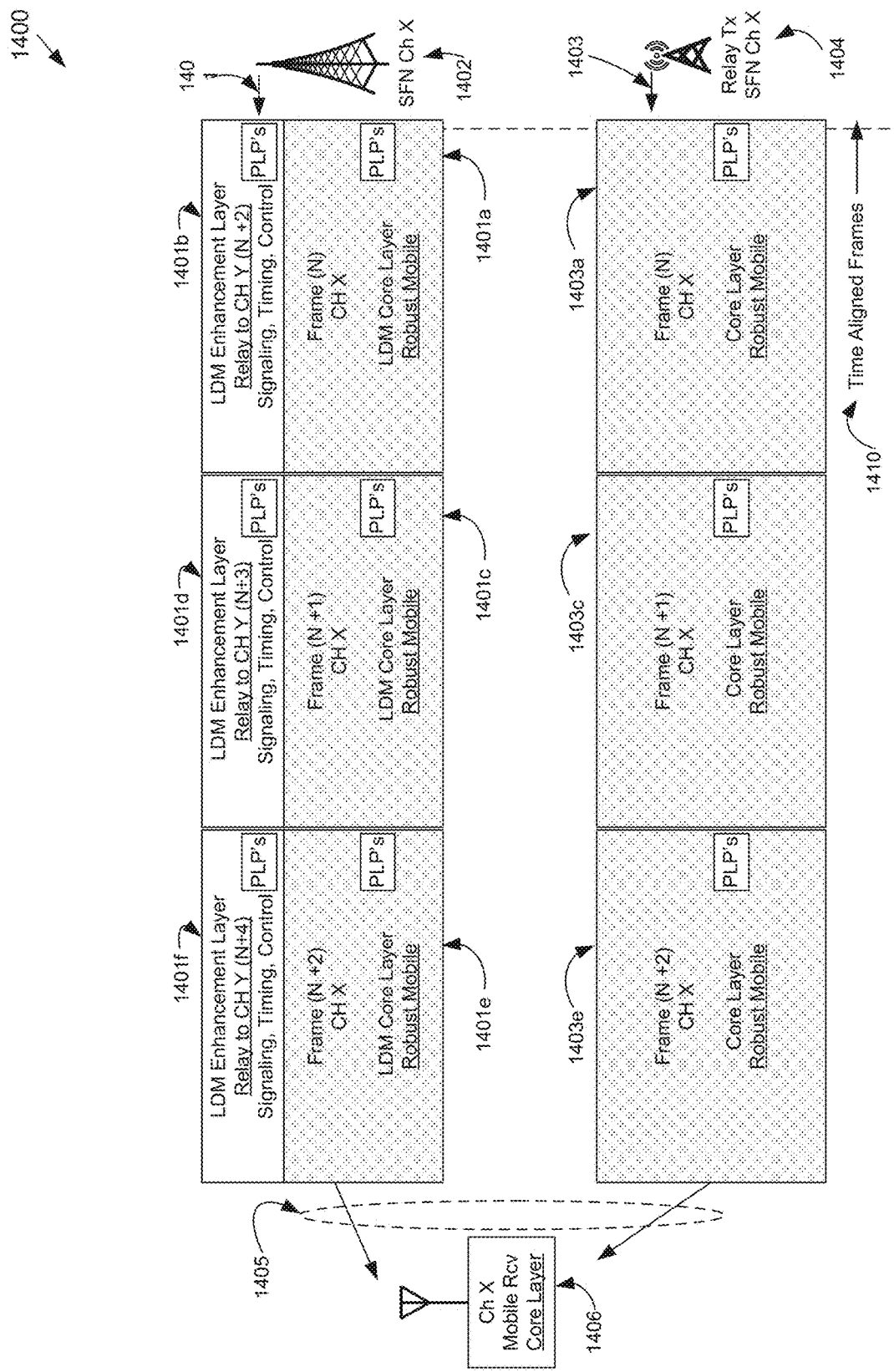
FIG. 14 depicts a timing diagram that compares the timing of two transmitters in an LDM SFN system that are coupled to a multi-channel gateway through different sources, according to some embodiments.

FIG. 14 depicts a timing diagram 1400 that compares the timing of Channel X transmissions 1401 from a Channel X SFN transmitter 1402 having an STL, connection to a multi-channel gateway, and transmissions 1403 from a Channel X SFN relay transmitter 1404 which receives content from a relay Channel Y LDM enhancement layer (e.g., 1303*b*, 1303*d*, 1303*f* in FIG. 13) in a cooperative multi-channel LDM relay SFN system, according to some embodiments. The two Channel X SFN transmitters broadcast the same LDM core layers 1401*a*, 1401*c*, 1401*e*, 1403*a*, 1403*c*, 1403*e* substantially simultaneously to allow for coherent reception 1405 of the Channel X LDM core layers by Channel X mobile receiver 1406. For example, transmissions 1401 and 1403 are time aligned 1410. In addition. Channel X SFN transmitter 1402 may broadcast an LDM enhancement layer 1401*b*, 1401*d*, 1401*f* that is not transmitted by Channel X SFN relay transmitter 1404 and is not decodable by Channel X mobile receiver 1406. The mobile receiver 1406 being both agnostic to SFN and LDM mitigates the multiple signals 1405 arriving at the receiver 1406 and processes them as if they were broadcast from a single Channel X transmitter.

The Channel X SFN enhancement layer 1401b, 1401d, 1401f may be intended for reception by a Channel X SFN relay receiver (e.g., 1307 in FIG. 13) and re-encoded for LDM core layer broadcast transmission by a Channel Y SFN transmitter (e.g., 1309 in FIG. 13). In some embodiments, the Channel X SFN transmitter 1402 receives information used to form LDM enhancement layers 1401b, 1401d, 1401f from an STL connection to a multi-channel gateway.

Figure 15:
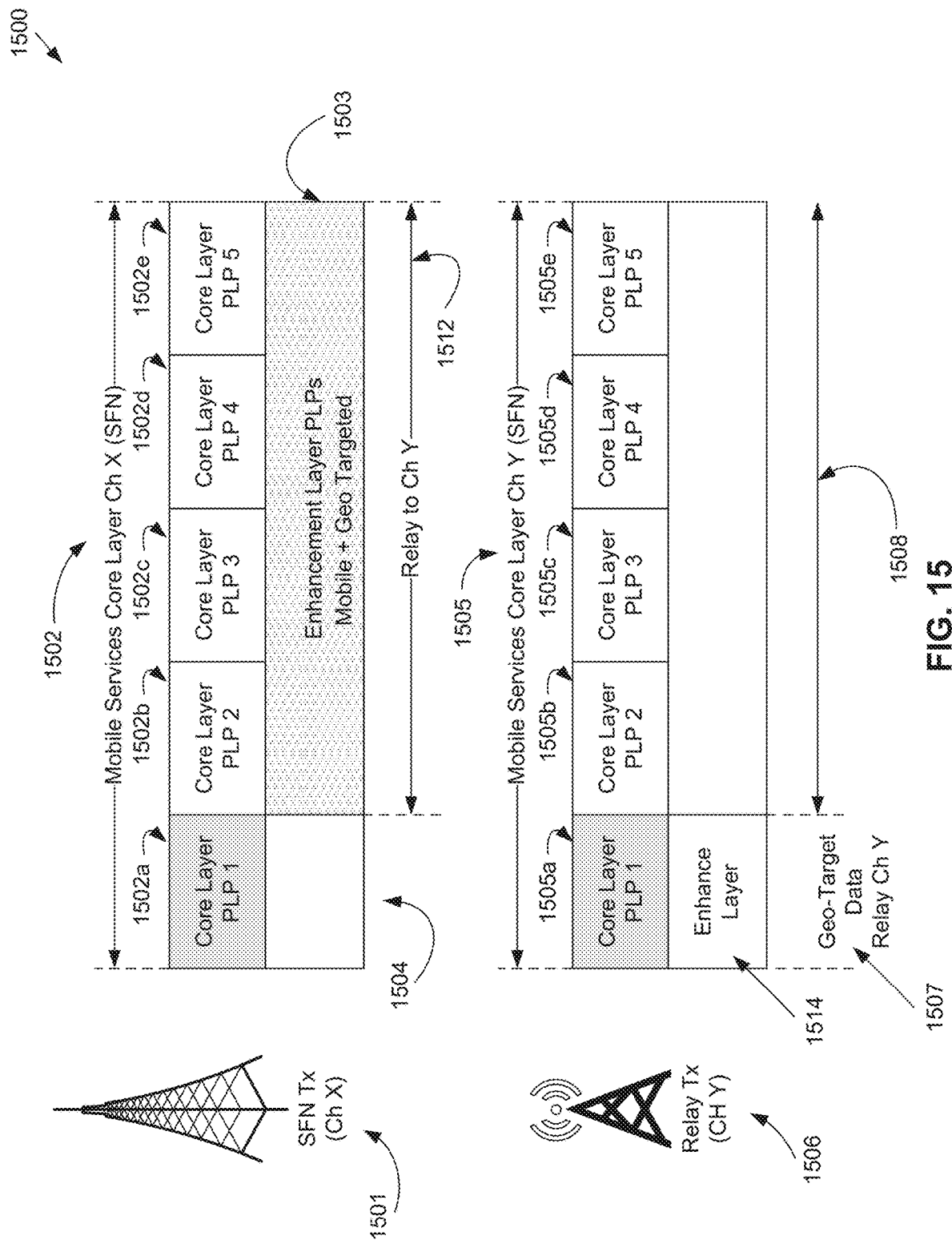
FIG. 15 illustrates a transmission scenario where geo-targeted data may be broadcast in a smaller contour around a relay transmitter while supporting a larger core layer mobile contour, according to some embodiments.

FIG. 15 illustrates a transmission scenario 1500 where independent geo-targeted data may be broadcast in a smaller contour around a Channel Y SFN relay transmitter 1506 while supporting a larger core layer mobile contour, according to some embodiments.

In some embodiments, Channel X SFN transmitter 1501 broadcasts a frame 1502 delivering mobile service on an LDM core layer and, on an LDM enhancement layer, relaying data, signaling, SFN timing, and geo-targeted data to Channel Y SFN relay transmitter 1506. The illustrated frame includes five PLPs 1-5 (1502a-1502e) divided into two sub-frames 1504, 1512. Sub-frame 1504 includes PLP1 (1502a), which is an independent sub-frame that does not contain an LDM enhancement layer. Sub-frame 1512 includes PLPs 2-5 (1502b-1502e), as well as an LDM enhancement layer 1503 carrying the data, signaling, SFN timing, and geo-targeted data for Channel Y SFN relay transmitter 1506.

Channel Y SFN relay transmitter 1506 may broadcast a frame 1505 delivering mobile service on an LDM core layer and, on an LDM enhancement layer, geo-targeted data. The Channel Y frame 1505 includes PLPs 1-5 (1505a-1505e) and may be divided into sub-frames 1507,1508. Sub-frame 1508 includes PLPs 2-5 (1505b-1505e) and transmits mobile services on an LDM core layer. Sub-frame 1507 includes PLP1 (1505a) as well as an enhancement layer 1514 delivering geo-targeted data. Note that other Channel Y SFN transmitters (not shown) may use the enhancement layer in sub-frame 1508 to relay Channel X data as shown in FIG. 13. The geo-targeted data is assumed cached at a particular SFN relay transmitter and is targeted to the location of SFN relay transmitter 1506. The different geo-targeted data can be delivered in advance by OTA relay as shown or by any method including Internet. The opportunity to insert local geo-targeted data may be orchestrated and signaled by the multi-channel gateway.

An example transmission configuration is disclosed using representative parameters from the ATSC 3.0 physical layer protocol. FIG. 22 discloses an example of 48 available options for ATSC 3.0 using LDPC short codes (16200) and QAM modulation (QPSK, 16 QAM, 64 QAM, 256 QAM) that may be potentially used for provisioning mobile service using the methods of LDM SFN relay mode disclosed herein. As an illustrative example, the transmitted signal may include an OFDM waveform having an FFT size of 8K, scattered pilots (SP 8_2) and longer GI (150 μs). In such an example, the bit rate is 10.2 Mbps and the required C/N in AWGN is 6.5 dB for the core layer. The total core layer bit rate of 10.2 Mbps can be divided into two unequal sub-frames: 4/5 or 8.16 Mbps for the independent sub-frame 1512 (PLP2, PLP3, PLP4 and PLP5) and 2.04 Mbps for the sub-frame 1504 including PLP1. Assuming an injection level of 16 dB for Channel X enhancement layer 1503, using the SNR equations described above relative to FIG. 10 independent sub-frames (PLP2, PLP3, PLP4 and PLP5) a core layer required C/N of 7.1 dB. The PLP1 core layer C/N remains 6.5 dB because there is no enhancement layer.

The LDM enhancement layer 1503 may be modulated and encoded using 64 QAM and an LDPC code rate of 2/5 and by keeping the same FFT, pilots, and GI as the LDM core layer. In this case, the independent sub-frame 1512 (PLP2, PLP3, PLP4 and PLP5) has a bit rate of 9.12 Mbps and using the SNR equations described above relative to FIG. 10, a C/N (AWGN) 7.9 dB is required for the enhancement layer 1503.

On Channel Y, the core layers 1505b-1505e of the independent sub-frame (PLP2, PLP3, PLP4 and PLP5) has a C/N of 6.5 dB for the same reason as core layer 1502a in Channel X (i.e., there is no enhancement layer). The independent sub-frame 1507 (PLP1) using an example injection level of 20 dB has a 6.7 dB C/N for the core layer. The enhancement layer (geo-targeted data) for this example uses QPSK modulation and 1/3 LDPC code rate and has a −1.3 dB C/N and using the SNR equations described above relative to FIG. 10, with 20 dB injection this becomes 20.2 dB C/N for LDM enhancement layer 1504.

Figure 16:
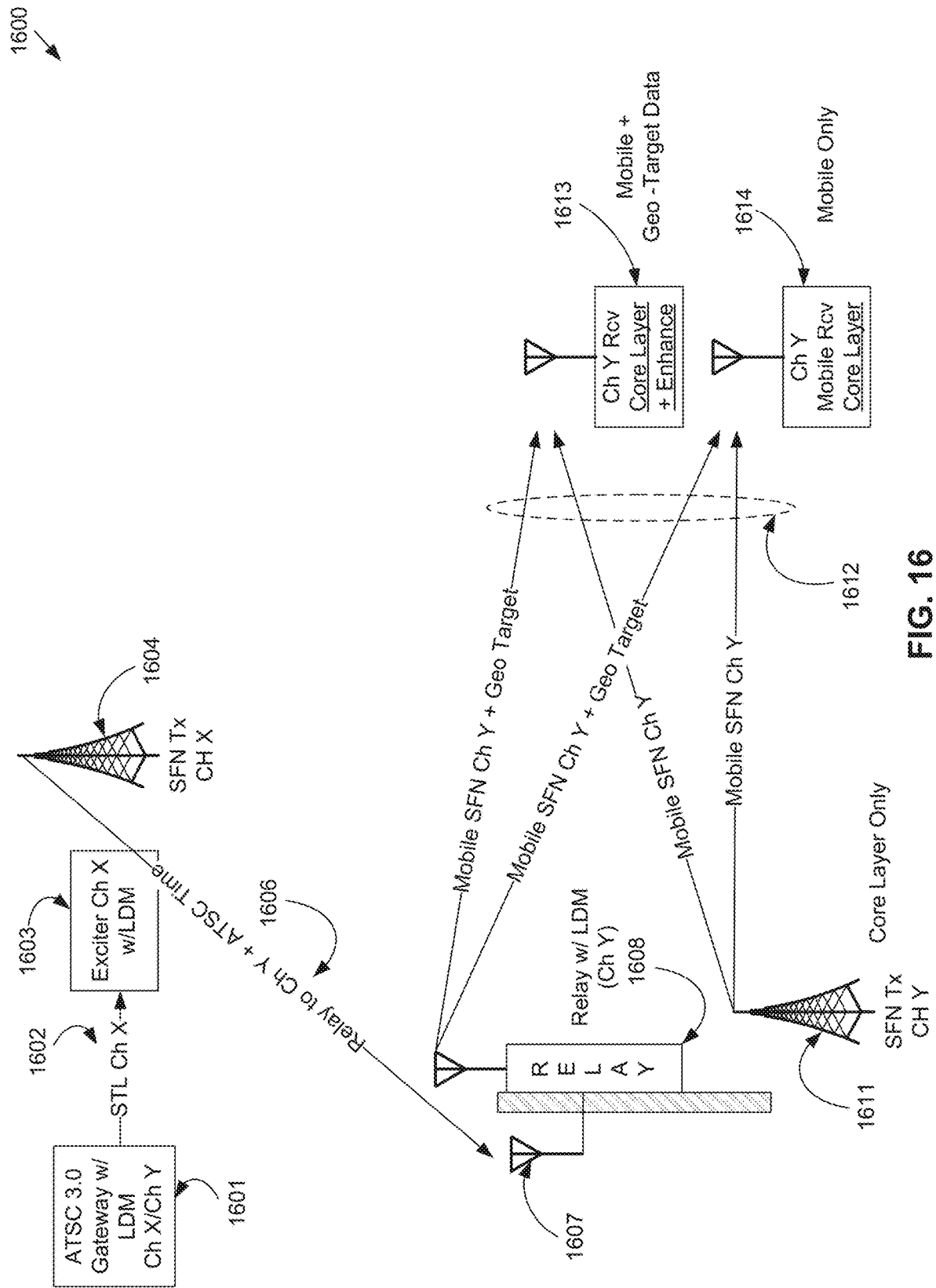
FIG. 16 depicts details of an exemplary end to end system for geo-targeted data illustrated in FIG. 15, according to some embodiments.

FIG. 16 depicts details of an exemplary end to end system 1600 for the geo-targeted data illustrated in FIG. 15, according to some embodiments. The multi-channel cooperative gateway 1601 may orchestrate both Channel X and Channel Y frames as shown in more detail in FIG. 13, but for simplicity and with focus on the geo-targeted, FIG. 16 emphasizes the differences in this example relative to the relay-only example. The STL 1602, Channel X exciter 1603, and Channel X SFN transmitter 1604 coordinate to relay 1606 Channel Y information to Channel Y SFN relay transmitter 1608, which may receive the relay information on an antenna 1607 tuned to a frequency corresponding to Channel X. The Channel X signal may correspond to transmission 1502 in FIG. 15.

The Channel Y SFN transmitter 1611 is also orchestrated by multi-channel gateway 1601 and an STL (not shown) and may transmit a similar frame structure as Channel X transmission 1502 in FIG. 15. The Channel Y SFN transmitter 1611 is shown delivering 1612 mobile core service to Channel Y mobile receiver 1614, which is capable of decoding the LDM core layer but is not capable of decoding the LDM enhancement layer. The Channel Y SFN transmitter 1611 also delivers 1612 mobile core service to Channel Y mobile receiver 1613, which is capable of decoding both LDM core and enhancement layers. The Channel Y SFN relay transmitter 1608 may broadcast a signal corresponding to transmission 1505 in FIG. 15, including geo-targeted data. The Channel Y SFN relay transmitter 1608 may deliver mobile data on an LDM core layer, and geo-targeted data on an LDM enhancement layer, both of which may be decoded by Channel Y mobile receiver 1613. The Channel Y mobile receiver 1614, however, does not receive the geo-targeted data and instead receives only the mobile service transmitted on the LDM core layer, treating the enhancement layer as noise.

In the two-channel cooperative LDM SFN relay mode, the LDM core layer of both channels carries the PLPs of their respective mobile services directly to mobile receivers, which are agnostic to the existence of any LDM enhancement layer. Each LDM enhancement layer of the cooperating channels provisions the SFN relay mode for the other cooperating channel. This reciprocal relationship enables more flexible establishment of a denser SFN infrastructure to increase the quality of service or introduce new services to consumers.

Figure 17:
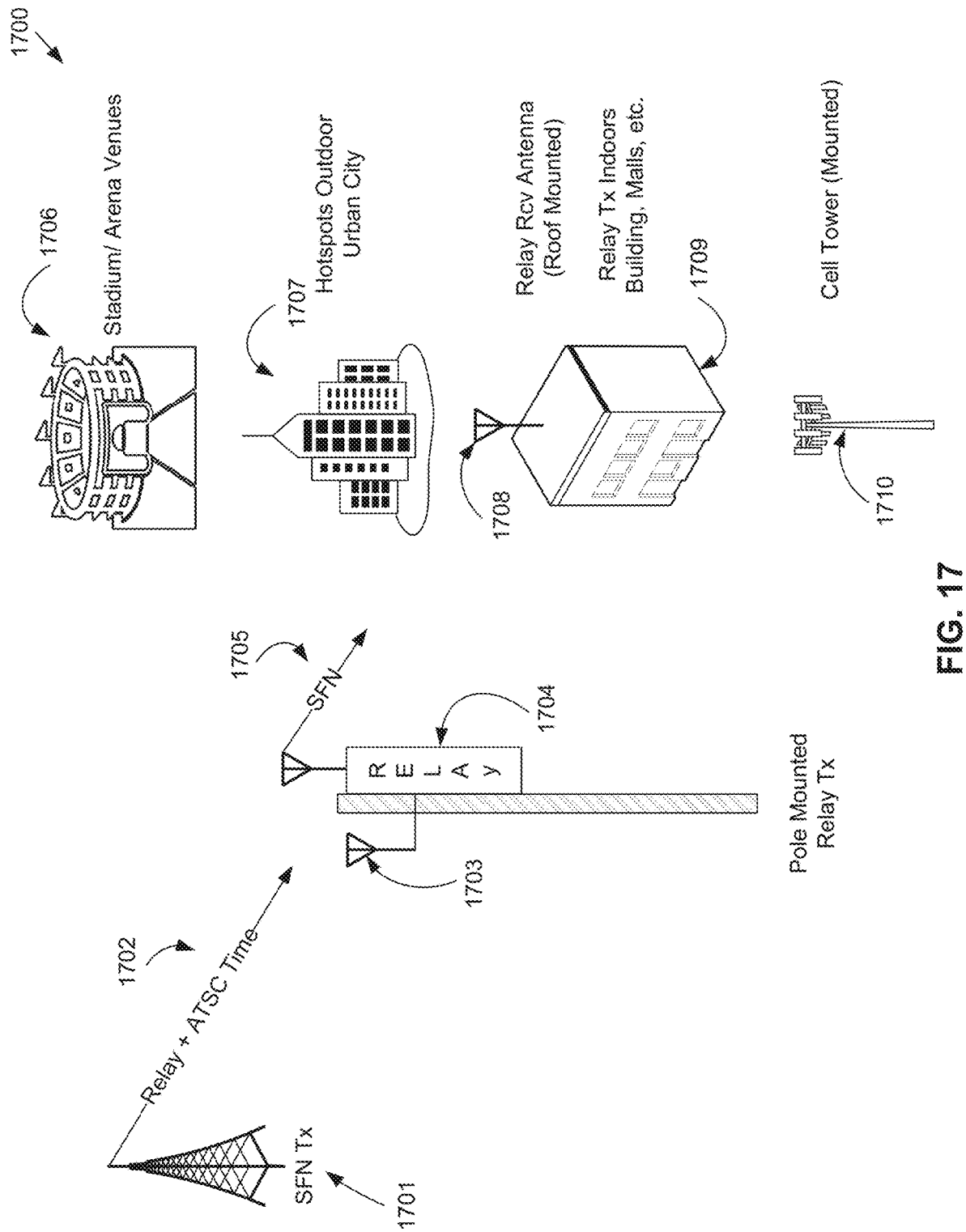
FIG. 17 depicts various deployment scenarios for SFN relay transmitters, according to some embodiments.

FIG. 17 depicts scenarios 1700 for SFN relay transmitters operating at a range of power levels (e.g., milliwatts to hundreds of kilowatts effective radiated power (ERP), depending on the implementation) to improve QoS by putting a broadcast signal where it is needed to fill in service gaps, serving both indoor and outdoor locations, adding hotspots in dense urban areas and at venues (stadiums, arenas), and mounting relays on cellular towers, according to some embodiments.

With the central orchestration of a multi-channel gateway, the SFN transmitter 1701 broadcasts 1702 an LDM relay signal and time information. For example, in the ATSC 3.0 standard, ATSC Time is broadcast over-the-air and carries TAI time stamps for establishing a wall clock at ATSC 3.0 consumer receiver. The ATSC Time with TAI timestamps can potentially be used as an alternative to having a time reference on site to further ease the deployment of low power relay transmitters.

An exemplary pole-mounted SFN relay transmitter enclosure 1704 may have a receive antenna 1703 and a transmit antenna 1705 which operate in different channels. For example, the receive antenna 1703 may receive relay signals on Channel X and the transmit antenna 1705 may broadcast signals on Channel Y. These types of SFN relay transmitters 1704 can be used at stadium arenas 1706 and can be unlimited in number. These SFN relay transmitters 1704 can also be deployed in urban areas 1707, or inside buildings and malls with an indoor mounted transmitter enclosure 1709 and outdoor mounted receive antenna 1708. The SFN relay transmitters 1704 can also be mounted on existing cellular towers 1710. There is no degradation of C/N for relay transmitters broadcasting only core layer as previously mentioned and the planning and design explained relative to FIG. 22 could be employed for these flexible options for SFNs.

For example, a high power SFN may be initially deployed using tall towers to achieve initial wide area coverage over an area. Subsequently, lower power SFN relay transmitters may be deployed to synergistically improve QoS, and/or to bring service to challenging reception environments.

Figure 18:
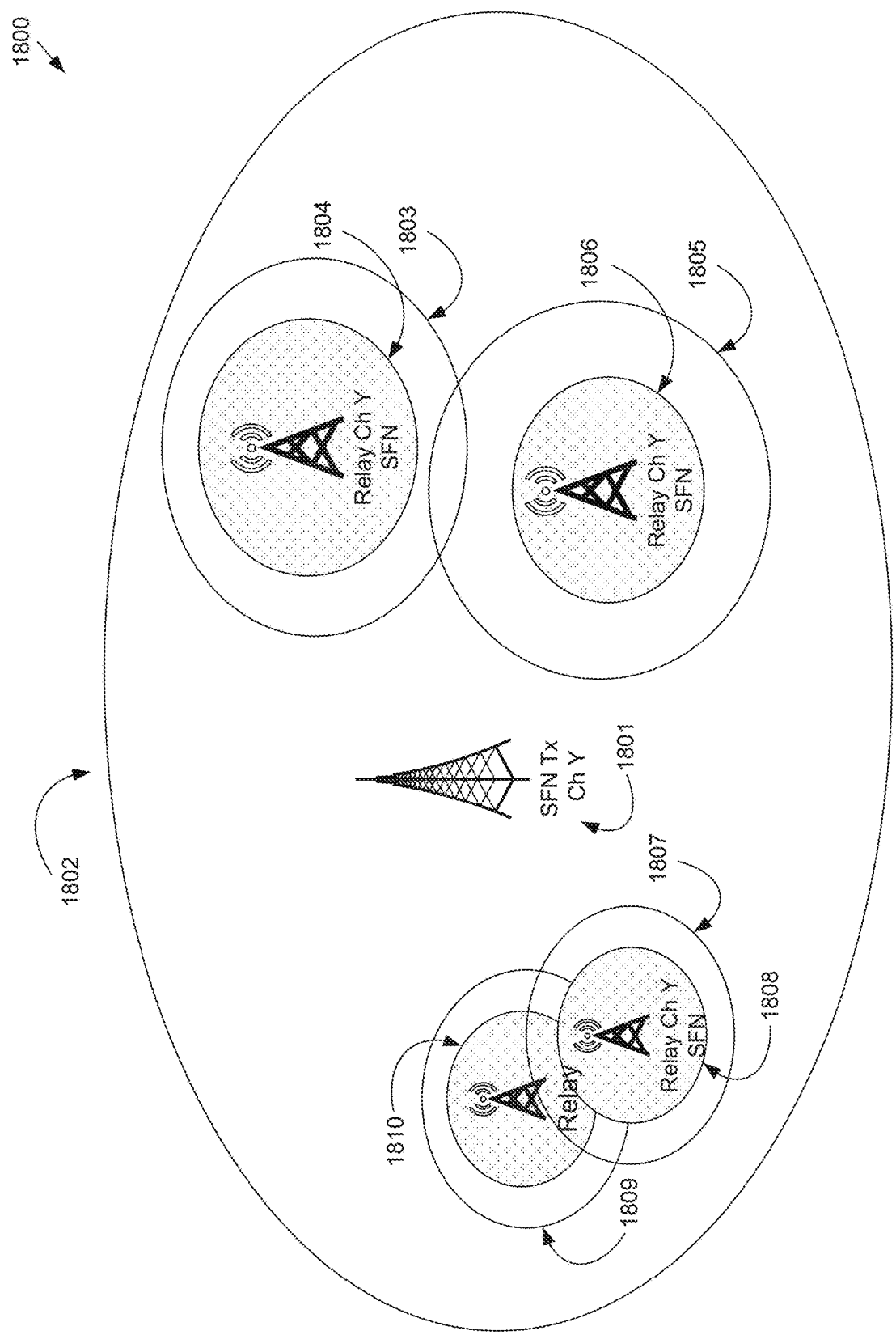
FIG. 18 depicts service contours for a geo-targeted system for SFN relay transmitters, according to some embodiments.

FIG. 18 depicts service contours 1800 for a geo-targeted system, according to some embodiments. The entire Channel Y service area may include wide area mobile service contour 1802 serviced by Channel Y SFN transmitter 1801, according to some embodiments. In addition, mobile contours 1803, 1805 may be serviced by Channel Y SFN relay transmitters that are coherent with 1802. These Channel Y SFN relay transmitters may also transmit geo-targeted data on an LDM enhancement layer that can only be decoded at relatively higher SNRs than the mobile service data, and therefore geo-targeted contours 1804, 1806 have a smaller footprint than the mobile contours 1803, 1805 emanating from the same transmitters.

In addition, mobile contours 1807, 1809 may be serviced by Channel Y SFN relay transmitters that are coherent with 1802. These Channel Y SFN relay transmitters may also transmit geo-targeted data over contours 1808, 1810 which are not independent but overlap, forming a SFN to improve service. These Channel Y relay transmitters could be low power and located close together and transmit synchronized geo-targeted data orchestrated by a multi-channel gateway.

Figure 19:
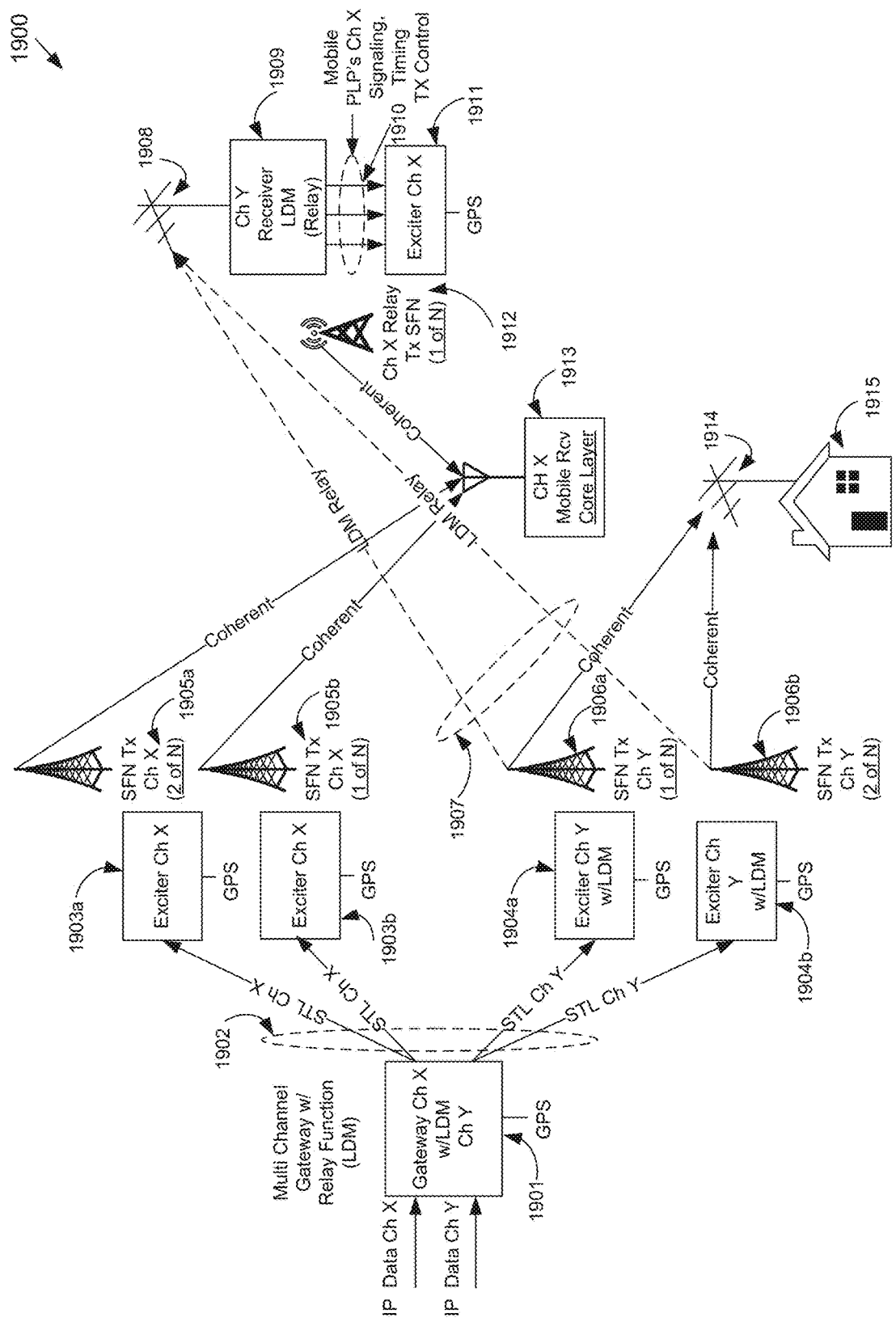
FIG. 19 depicts another example of a single cooperating SFN utilizing LDM, according to some embodiments.

FIG. 19 depicts a system 1900 for a single cooperating SFN utilizing LDM, according to some embodiments. In the illustrated embodiment, the Channel Y SFN delivers fixed television service on an LDM core layer and provides LDM SFN relay function on an LDM enhancement layer. The Channel Y LDM SFN relay function supports a Channel X core layer robust mobile service. In some embodiments, Channel X does not provide reciprocal cooperation.

In some embodiments, multi-channel gateway 1901 supports LDM relay function on Channel Y only. STL 1902 connects the multi-channel gateway 1901 to slave exciters 1903a, 1903b that provide core layer mobile service. STL 1902 also connects the multi-channel gateway 1901 to LDM slave exciters 1904a 1904b, which provide fixed core layer service and enhancement layer relay function to Channel X.

Channel Y SFN transmitters 1906a, 1906b provide coherent signals to fixed antenna 1914, providing service directly to a consumer's home 1915, which receives only services provided on an LDM core layer. The LDM enhancement layer 1907 is provided to antenna 1908 of Channel Y professional relay receiver 1909 and processed to receive relay PLP data, signaling, SFN timing and Tx control 1910. The Channel X slave exciter 1911 uses this information to provide core layer mobile services located at Channel X SFN relay transmitter site 1912. The Channel X mobile receiver 1913 decodes only an LDM core layer from coherent signals from both Channel X SFN transmitters 1905a, 1905b and the Channel X SFN relay transmitter 1912.

In this example, the Channel X transmitters 1905a, 1905b and Channel X SFN relay transmitter 1912 provide mobile service on an LDM core layer. In some embodiments, the LDM core layer may be modulated and encoded using parameters chosen from those supported by ATSC 3.0. In some embodiments, the LDM core layer may be modulated and encoded using 16 QAM and an LDPC code rate of 8/15. In this scenario, the signal may have a spectral efficiency of approximately 2.0 bits/s/Hz using an 8K FFT, scattered pilots (SP 8_2) and longer GI (150 μs). The bit rate may be 10.2 Mbps and required C/N assuming AWGN may be 6.5 dB for the Channel X LDM core layer.

Channel Y fixed service transmitted on an LDM core layer can use a 16K FFT and 256 QAM with an 8/15 code rate (e.g., using LDPC long codes 64800), scattered pilots (SP 16_2), and a longer GI (150 μs). In such a scenario, the bit rate may be 22.5 Mbps and required C/N in AWGN may be 14 dB. Assuming an injection level 20 dB, the enhancement layer C/N may be 15.3 dB at fixed antenna 1914 in home 1915.

The LDM enhancement layer Channel Y LDM relay may be transmitted with 16 QAM and 8/15 code rate (e.g., using LDPC long codes 64800). In this scenario, the bit rate may be 11.2 Mbps and C/N in AWGN may be 6.3 dB. Assuming a 20 dB injection level for the enhancement layer, the C/N for the enhancement layer may be 26.3 dB at Channel Y LDM receiver 1909 at the Channel X relay transmitter site.

Figure 20:
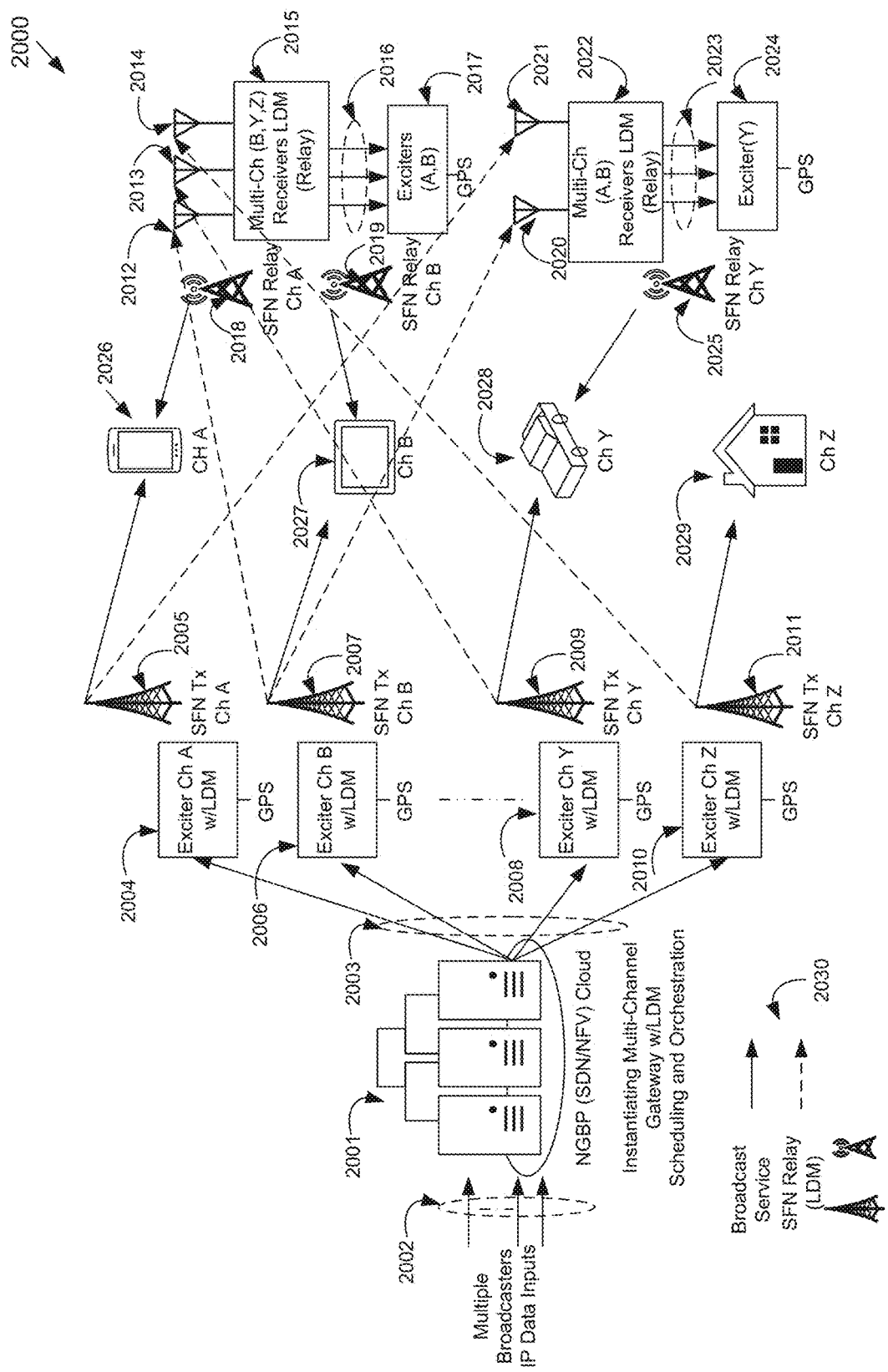
FIG. 20 depicts another example of using the LDM SFN relay mode, according to some embodiments.

FIG. 20 depicts another example using the LDM SFN relay mode, according to some embodiments. The exemplary system 2000 includes a multi-channel gateway instantiated using SDN/NFV in a community cloud 2001. The community cloud 2001 creates and orchestrates the broadcast Radio Access Network (RAN) of multiple cooperating broadcasters 2002 virtualizing the broadcast channels (A-Z), which could represent portions of the broadcast band (e.g., Channels 2-36) in the United States.

The community cloud 2001 is based on the ETSI NFV architecture reference model which is also being contemplated by the wireless industry and mobile network operators for future 5G networks (and/or other similar more evolved systems). The community cloud 2001 may be constructed using commercial off the shelf (COTS) computer server hardware, storage and networking abstracted by a hypervisor forming virtual machines (VM) under direct control of virtual infrastructure management (VIM) such as OpenStack SDN (virtual switches) can be used to chain together several virtual network functions (VNF) software instances running on separate (VM) under VNF Management and VNF Orchestration (MANO), coordinating the capabilities of the multi-channel gateway in a real-time native cloud environment with the elasticity and scalability for supporting multiple channels concurrently. This enables efficiency and innovation of services for the cloud tenants. The SFN master and slave nodes shown have GPS or TAI time references available.

The community cloud 2001 provides the interfaces for inputting IP content and data from the multiple broadcast tenants 2002 and schedules these on OFDM resources across multiple channels on broadcast PLPs. The community cloud 2001 then outputs preprocessed data, signaling, SFN timing, and transmitter control via STL 2003 to the respective SFN slave node exciters 2004, 2006, 2008, 2010 on Channels A, B, Y, Z, respectively, and to the respective SFN transmitters 2005, 2007, 2009, 2011.

In some embodiments, the Channel A, B, and Y SFN transmitters 2005, 2007, 2009 may provide SFN mobile service with the assistance of SFN relay transmitters 2018, 2019, 2025 to mobile receivers 2026, 2027, 2028, respectively. The Channel Z SFN transmitters 2011 may provide SFN fixed services to the fixed receivers 2029 without benefit of SFN relay transmitters.

Some of the potential diversity embodiments can be seen by observing the multi-channel LDM relay receivers 2015 co-located at the Channels A and B SFN relay transmitter sites 2018, 2019 that receive the LDM relay from SFN transmitters 2007, 2009, 2011. The Channels B, Y, and Z receive antennas 2012, 2013, 2014 may receive the centrally orchestrated PLP data, signaling, SFN timing and transmitter control scheduled across these multiple cooperating channels by community cloud 2001, which is then interfaced 2016 to the Channels A and B SFN slave exciters 2017. Channels A and B SFN slave exciters 2017 on Channels A and B then process the information to broadcast on their respective channels using respective SFN relay transmitters 2018, 2019 for providing mobile services to receivers 2026, 2027.

In addition, the orchestration diversity, which includes policy and permissions oversight and enforcement, can be seen by observing the multi-channel LDM relay receivers 2022 co-located at the Channel Y SFN relay transmitter site 2025. The LDM relay receiver 2022 may receive the LDM relay from SFN transmitters 2005, 2007. The Channels A and B receive antennas 2020, 2021 may receive the centrally orchestrated PLP data, signaling, SFN timing and transmitter control scheduled across these multiple cooperating channels by 2001, which is then interfaced 2023 to the Channel Y SFN slave exciter 2024 and respective SFN relay transmitter 2025 providing mobile services to receivers 2028. The OFDM parameters and SNR equations previously disclosed for designing LDM relay mode can be applied.

Figure 21A:
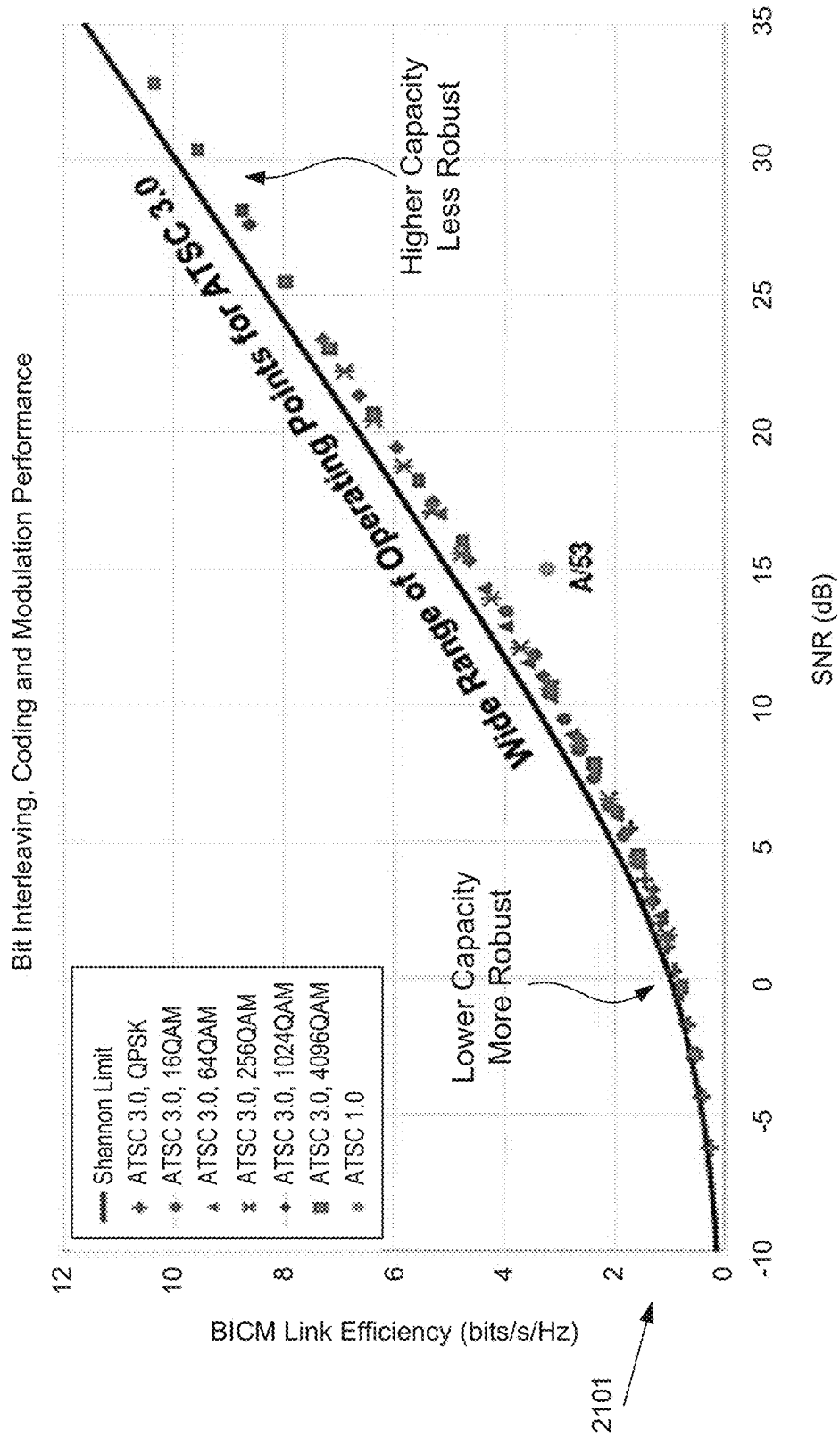

FIGS. 21A and 21B provide information 2100 that represent an example of the new ATSC 3.0 physical layer and its wide range of operating points 2101 that can be chosen for a given service PLP by selections 2102 from six modulation levels (QPSK, 16 QAM, 64 QAM, 256 QAM, 1024 QAM, 4096 QAM) and twelve LDPC code rates (2/15-13/15), giving a total of 72 potential operating points, according to some examples. Although FIG. 21A illustrates selection 2102 with respect to non-uniform constellation (NUC), selection 2102 can include any other modulations, such as but not limited to, QAM Stands for Quadrature Amplitude Modulation. In some examples, a robust operating point is −6 dB SNR, having capacity of 1.3 Mbps, and the least robust operating point is 33 dB SNR, having capacity of 59 Mbps. Each operating point operates at a spectrum efficiency approaching the Shannon limit as illustrated 2101. The current ATSC A/53 standard that is currently deployed in the United States has only a single operating point, shown in the graph 2101, and this operating point is not spectrum efficient. This wide number of very efficient operating points is used in part in with other technology in the design of the SFN relay modes disclosed herein.

FIG. 22 and depicts an example of 48 available options 2200 for ATSC 3.0 using LDPC short codes (16200) and QAM modulation (QPSK, 16 QAM, 64 QAM, 256 QAM) that may be potentially used for provisioning mobile service using the methods of LDM SFN relay mode disclosed. FIG. 22 represents the highest bit rates (in Mbps) from ATSC 3.0. A couple of examples will be selected from FIG. 22 that have a spectral efficiency of approximately 2.0 bits/s/Hz, which is assumed achievable with a dense SFN. The selected examples will be provisioned with 8K FFT and the requisite scattered pilot density and guard intervals (GI) lengths to support a typical SFN mobile. Use of denser scattered pilot patterns and longer GI length than those chosen in the disclosed examples are possible, and may result in lower bit rates than depicted in FIG. 22. However, the FIG. 22 C/N values will remain valid in such cases.

The first selection from FIG. 22 for the robust core layer mobile is 16 QAM and LDPC code rate of 8/15 which has a spectral efficiency of approximately 2.0 bits/s/Hz. This is shown to deliver a bit rate of 12.8 Mbps in a 6 MHz channel. After selecting an 8K FFT, scattered pilots (SP 8_2) and longer GI (150 µs) the bit rate is 10.2 Mbps and the robustness remains C/N (AWGN) 6.5 dB.

The enhancement layer may be selected as 64 QAM and LDPC code rate 2/5 and by keeping same the FFT, Pilots, GI as selected previously for the core layer, a bit rate of 11.4 Mbps and C/N of 7.9 dB can be obtained.

An injection level of 12 dB is selected in one example. The degradation of the core layer C/N of 6.5 dB as previously calculated becomes 8.2 dB and the enhancement layer C/N of 7.9 dB as calculated becomes C/N 20.2 dB. Changing the injection level to 16 dB, the degradation of the core layer C/N 6.5 dB becomes 7.1 dB and the enhancement layer C/N of 7.9 dB becomes 24 dB. In some embodiments, the LDM relay transmitters do not have a C/N quality degradation since only the core layer is broadcast—i.e., there is no enhancement layer to reduce the C/N.

Figure 23:
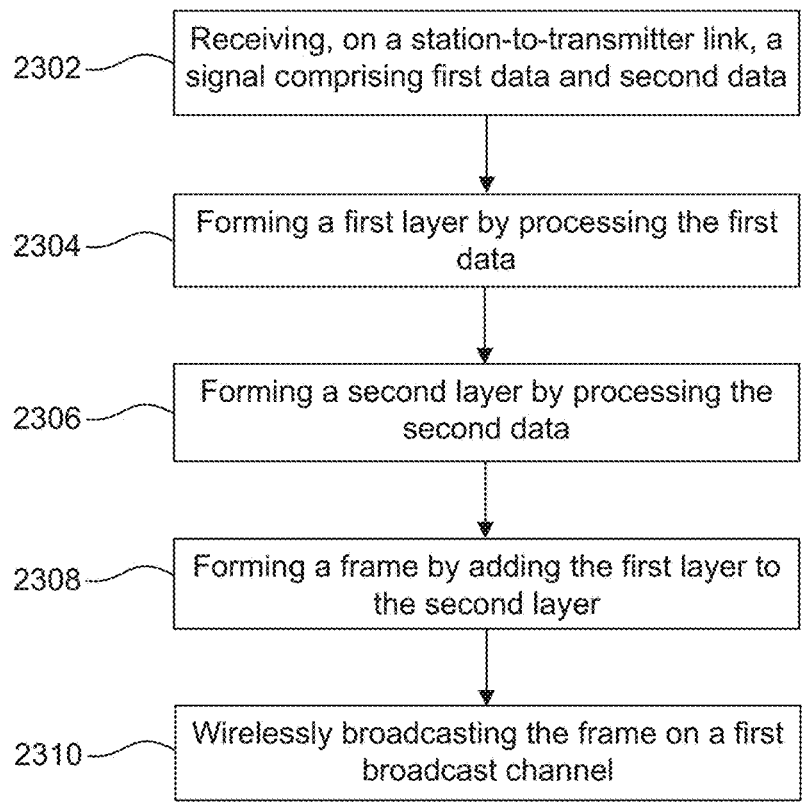
FIG. 23 is a flowchart depicting a method for generating a frame based on a received signal on a station-to-transmitter link, according to some embodiments.

FIG. 23 is a flowchart depicting a method 2300, according to an embodiment of the present disclosure. For example, method 2300 can generate a frame based on a received signal including first data and second, according to some embodiments. In one embodiment, method 2300 is performed by system 1100 of FIG. 11, system 1300 of FIG. 13, system 1400 of FIG. 14, and/or system 1500 of FIG. 15. Reference is made to system 1100 in FIG. 11 and system 1300 in FIG. 13 merely for convenience of discussion. Other systems may be used to perform the method as will be understood by those skilled in the arts. It is to be appreciated not all steps may be needed, and the steps may not be performed in the same order as shown in FIG. 23.

In step 2302, a signal including first data and second data is received on a station-to-transmitter link. For example, one or more SFN transmitters 1103a, 1103b, 1153a, or 1153b receive the signal on one or more STLs 1102a, 1102b, 1152a, or 1152b, respectively, of FIG. 11. The signal includes the first data and the second data. As a non-limiting example, the Channel X SFN transmitter 1103a receives the signal from the gateway 1190 on STL 1102. In this example, the first data can include Channel X signal/data and the second data can include Channel Y relay data/signal.

In step 2304, a first layer is formed by processing the first data. In step 2306, a second layer is formed by processing the second data. :For example, the Channel X SFN transmitter 1103 of FIG. 11 forms the first layer (e.g., the core layer based on and for transmitting Channel X data) and forms the second layer (e.g., the enhancement layer based on and for transmitting Channel Y data). In some embodiments, the power of the second layer (e.g., the enhancement layer) can be less than the power of the first layer (e.g., the core layer).

According to some embodiments, the Channel X SFN transmitter 1103 is configured to process the first layer by, for example, encoding the first data using a low-density parity check (LDPC) code having a first code rate. Additionally or alternatively, the Channel X SFN transmitter 1103 is configured to process the second layer by, for example, encoding the second data using an LDPC code having a second code rate.

In step 2308, a frame is formed by adding the first layer to the second layer. For example, the Channel X SFN transmitter 1103 generates the frame by adding the first layer to the second layer, as illustrated in, for example, FIGS. 13-15. A non-limiting example of the frame is shown in Channel X transmissions 1301 of FIG. 13. In some examples, the frame can be compliant with ATSC 3.0 specification. Additionally or alternatively, the frame can include a bootstrap.

In step 2310, the frame is wirelessly broadcast on a first broadcast channel. For example, the Channel X SFN transmitter 1103a wirelessly broadcasts the frame on Channel X. According to some examples, the first data can include a television signal for transmission on the first broadcast channel and the second data can includes a second television signal for transmission on a second broadcast channel. The second data may also include control information corresponding to a future transmission of the second data on the second broadcast channel, According to some embodiments, the Channel X SFN transmitter 1103a can transmit the frame substantially simultaneously with one or more other transmitters (e.g., Channel X SFN transmitter 1103b) transmitting the same frame.

Figure 24:
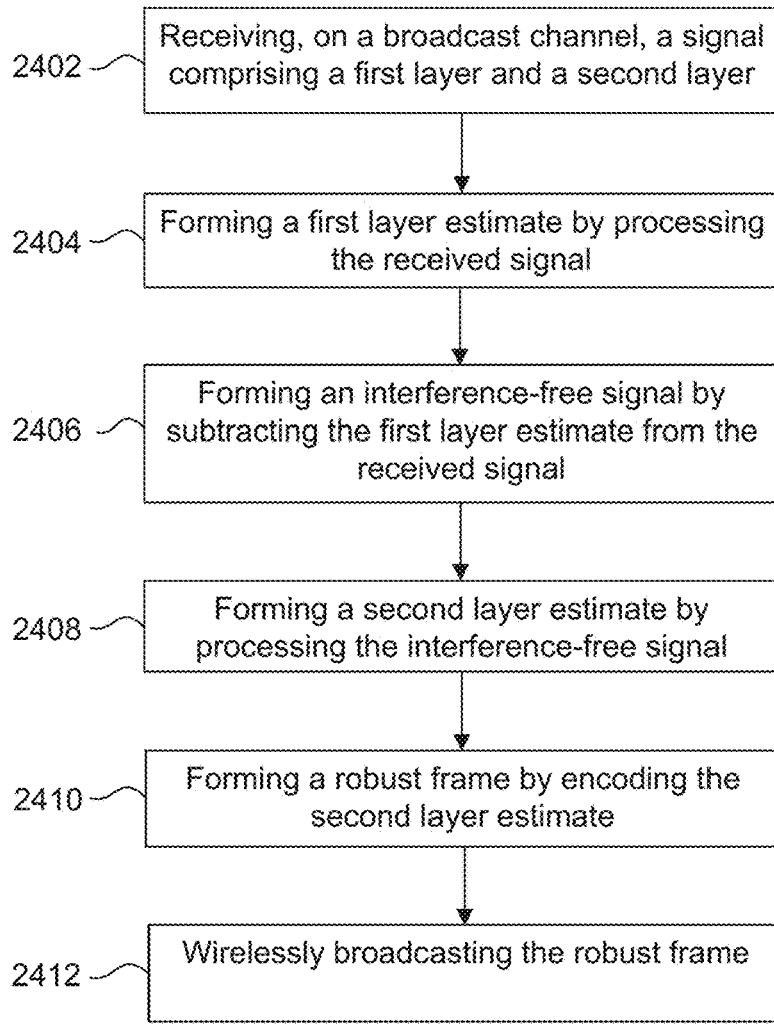
FIG. 24 is a flowchart depicting a method for generating a robust frame based on a received signal on a broadcast channel, according to some embodiments.

FIG. 24 is a flowchart depicting a method 2400, according to an embodiment of the present disclosure. For example, method 2400 can generate a robust frame based on a received signal on a broadcast channel, according to some embodiments. In one embodiment, method 2400 is performed by system 1200 of FIG. 12. Reference is made to system 1200 in FIG. 12 merely for convenience of discussion. Other systems may be used to perform the method as will be understood by those skilled in the arts. It is to be appreciated not all steps may be needed, and the steps may not be performed in the same order as shown in FIG. 24.

In step 2402, a signal including a first layer and a second layer are received on a broadcast channel. For example, relay receiver 1202 of FIG. 12 receives the signal using antenna 1201 from SFN transmitter 1210. According to some embodiments, the received signal includes control information, timing information, signaling, and/or content. Additionally or alternatively, the received signal is compliant with an Advanced Television Systems Committee (ATSC) 3.0 specification or other wireless standard(s) used in the U.S. o outside the U.S.

In step 2404, a first layer estimate is formed by processing the received signal. For example, the relay receiver 1202 forms the first layer estimate by processing the received signal. To process the received signal, the relay receiver 1202 may demodulate, deinterleave, demap, and decode the received signal, as discussed in FIG. 12, according to some examples. Processing the received signal to form the first layer estimate can further include regenerating an estimated bit-interleaved coded modulation signal.

In step 2406, an interference-free signal is formed based on, for example, averaging the first layer estimate and the received signal. For example, the relay receiver 1202 subtracts (e.g., using subtraction 1211 of FIG. 12) the first layer estimate from the received signal. In step 2408, a second layer estimate is formed by processing the interference-free signal. For example, the relay receiver 1202 processes (e.g., demaps, decodes, and the like) to generate the second layer estimate.

In step 2410, a robust frame is formed by encoding the second layer estimate. In some embodiments, the relay receiver 1202 (using, for example, baseband de-framer 1208) encodes the second layer estimate to generate the robust frame. Additionally or alternative, the exciter 1220 encodes the second layer estimate to generate the robust frame. In some examples, the received signal includes control information, and forming the robust frame includes encoding the second layer estimate based at least in part on the control information.

In step 2412, the robust frame is wirelessly broadcast. For example, the relay receive 1202 using the exciter 1220 and/or SFN relay transmitter 1230 wirelessly broadcasts the robust frame. In some examples, the robust frame is broadcast on a broadcast channel different than the broadcast channel on which the relay receiver 1202 received the received signal. As a non-limiting example, the relay receiver 1202 can receive the signal on Channel X and broadcast the robust frame on Channel Y, different than Channel X. According to some embodiments, the frames transmitted on the other broadcast channel are substantially synchronized with the frames transmitted on the broadcast channel.

It is to be appreciated that embodiments of the disclosure can be implemented by a broadcast system having any combination of hardware, software, or firmware. A broadcast system can include, but is not limited to, a device having a processor and memory, including a non-transitory memory, for executing and storing instructions. A processor can include circuits configured to carry out logic and/or instructions to perform arithmetical, logical, and/or input/output (I/O) operations of the broadcast system and/or one or more components of the broadcast system. Examples of such circuits include field-programmable gate arrays (FPGAs), application-specific integrated circuits (ASICs), digital signal processors (DSPs), and general-purpose processors (GPPs). The memory may tangibly embody the data and program instructions. Software may include one or more applications and an operating system. Hardware can include, but is not limited to, a radio frequency (RF) transmitter including an RF front-end, an antenna, a processor, and a memory. The broadcast system may also have multiple processors and multiple shared or separate memory components. The (broadcast) receiver may be any embodiment ranging from a television receiver to an Internet of Things (IoT) device.

Figure 25:
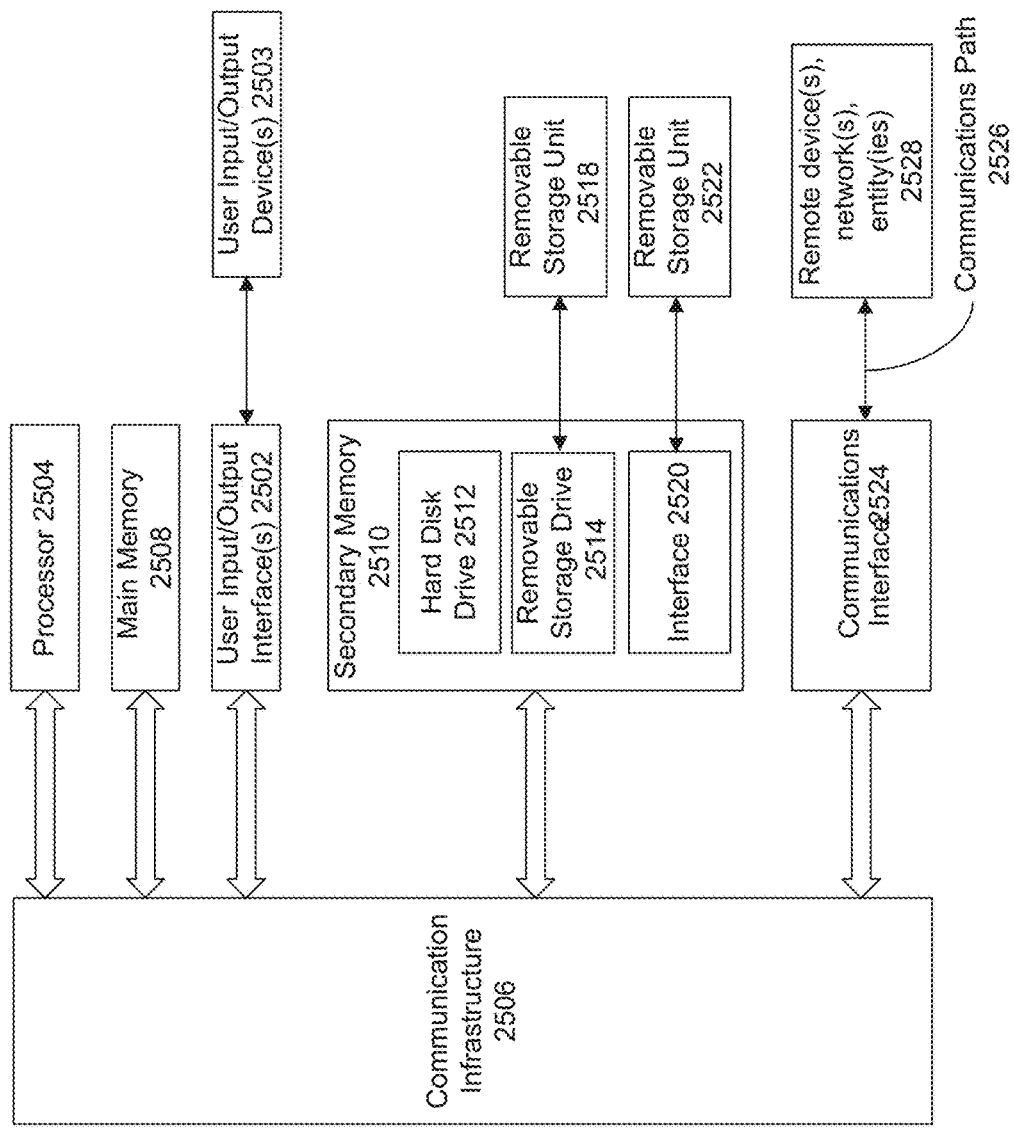
FIG. 25 illustrates a computer system that can be utilized to implement one or more embodiments.

For example, various embodiments can be implemented using one or more computer systems, such as computer system 2500 shown in FIG. 25. Computer system 2500 can be used, for example, to implement method discussed in this disclosure such as, but not limited to, method 2300 of FIG.

23 and/or method 2400 of FIG. 24. Also, one or more of systems or part of the systems discussed in this disclosure can be implemented using computer system 2500. In one example, one or more of the gateways (e.g., gateway(s) 102, 202, 252, 502, 1190, 1601, 1901, 2001), one or more of the exciters (e.g., exciter(s) 105, 204, 254, 504, 620, 1104, 1111, 1154, 1166, 1220, 1308, 1311, 1603, 1903, 1904, 1911, 2004, 2006, 2008, 2010, 2017, 2024), one or more of the relay receivers (e.g., relay receiver(s) 210, 211, 602, 702, 1109, 1164, 1202, 1307, 1310, 1909, 2015, 2022), one or more of the transmitters (e.g., transmitter(s) 106, 203, 253, 310, 410, 505, 610, 630, 701, 703, 1000, 1103, 1153, 1112, 1162, 1210, 1230, 1302, 1304, 1309, 1312, 1402, 1404, 1501, 1506, 1604, 1608, 1611, 1701, 1704, 1801, 1905, 1906, 1912, 2005, 2007, 2009, 2011, 2018, 2019, 2025), and/or one or more of the consumer receivers (e.g., consumer receiver(s) 110, 206, 256, 711, 712, 1106, 1156, 1406, 1613, 1614, 1913, 2026, 2027, 2028, 2029) of this disclosure can be implemented using (and/or include) the computer system 2500. Computer system 2500 can be any computer capable of performing the functions described herein.

Computer system 2500 can be any well-known computer capable of performing the functions described herein.

Computer system 2500 includes one or more processors (also called central processing units, or CPUs), such as a processor 2504. Processor 2504 is connected to a communication infrastructure or bus 2506.

Computer system 2500 also includes user input/output device(s) 2503, such as monitors, keyboards, pointing devices, etc., that communicate with communication infrastructure 2506 through user input/output interface(s) 2502.

Computer system 2500 also includes a main or primary memory 2508, such as random access memory (RAM). Main memory 2508 can include one or more levels of cache. Main memory 2508 has stored therein control logic (i.e., computer software) and/or data.

Computer system 2500 can also include one or more secondary storage devices or memory 2510. Secondary memory 2510 can include, for example, a hard disk drive 2512 and/or a removable storage device or drive 2514. Removable storage drive 2514 can be a solid state memory, a floppy disk drive, a magnetic tape drive, a compact disk drive, an optical storage device, tape backup device, and/or any other storage device/drive.

Removable storage drive 2514 can interact with a removable storage unit 2518. Removable storage unit 2518 includes a computer usable or readable storage device having stored thereon computer software (control logic) and/or data. Removable storage unit 2518 can be a floppy disk, magnetic tape, compact disk, DVD, optical storage disk, and/any other computer data storage device. Removable storage drive 2514 reads from and/or writes to removable storage unit 2518 in a well-known manner.

According to an exemplary embodiment, secondary memory 2510 can include other means, instrumentalities or other approaches for allowing computer programs and/or other instructions and/or data to be accessed by computer system 2500. Such means, instrumentalities or other approaches can include, for example, a removable storage unit 2522 and an interface 2520. Examples of the removable storage unit 2522 and the interface 2520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 2500 can further include a communication or network interface 2524. Communication interface 2524 enables computer system 2500 to communicate and interact with any combination of remote devices, remote networks, remote entities, etc. (individually and collectively referenced by reference number 2528). For example, communication interface 2524 can allow computer system 2500 to communicate with remote devices 2528 over communications path 2526, which can be wired and/or wireless, and which can include any combination of LANs, WANs, the Internet, etc. Control logic and/or data can be transmitted to and from computer system 2500 via communication path 2526.

In an embodiment, a tangible apparatus or article of manufacture comprising a tangible computer useable or readable medium having control logic (software) stored thereon is also referred to herein as a computer program product or program storage device. This includes, but is not limited to, computer system 2500, main memory 2508, secondary memory 2510, and removable storage units 2518 and 2522, as well as tangible articles of manufacture embodying any combination of the foregoing. Such control logic, when executed by one or more data processing devices (such as computer system 2500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 25. In particular, embodiments can operate with software, hardware, and/or operating system implementations other than those described herein.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   receiving, by a first apparatus of a first Single Frequency Network (SFN) from a second SFN and on a first broadcast channel associated with a first frequency band, a signal comprising a first layer and a second layer;
   forming a first layer estimate by processing the received signal;
   forming an interference-free signal by subtracting the first layer estimate from the received signal;
   forming a second layer estimate by processing the interference-free signal;
   forming a first robust frame by encoding the second layer estimate;
   wirelessly broadcasting, to a receiver device, the first robust frame on a second broadcast channel different from the first broadcast channel, wherein the second broadcast channel is associated with a second frequency band different from the first frequency band; and
   wirelessly broadcasting, by a second apparatus of the first SFN coupled to a gateway device using a station-to-transmitter link, a second robust frame over the second broadcast channel to the receiver device, wherein the first and second robust frames are coherent signals.

2. The method of claim 1, wherein frames transmitted on the second broadcast channel are substantially synchronized with frames transmitted on the first broadcast channel.

3. The method of claim 1, wherein forming the first layer estimate by processing the received signal comprises regenerating an estimated bit-interleaved coded modulation signal.

4. The method of claim 1, wherein the received signal received from the second SFN includes control information, and wherein forming the first robust frame comprises encoding the second layer estimate based at least in part on the control information.

5. The method of claim 4, wherein the control information comprises timing information.

6. The method of claim 1, wherein the received signal received from the second SFN is compliant with an Advanced Television Systems Committee (ATSC) 3.0 specification.

7. A Single Frequency Network (SFN), comprising:
   a first apparatus, comprising:
      a first antenna tuned to a first broadcast channel associated with a first frequency band;
      a second antenna tuned to a second broadcast channel associated with a second frequency band different from the first frequency band; and
      a first processor coupled to the first antenna and the second antenna, the first processor configured to:
         receive, from the first antenna, a signal received from a second SFN, the signal comprising a first layer and a second layer;
         form a first layer estimate by processing the received signal;
         form an interference-free signal by subtracting the first layer estimate from the received signal;
         form a second layer estimate by processing the interference-free signal;
         form a first robust frame by encoding the second layer estimate; and
         transmit the first robust frame to the second antenna for wireless broadcasting to a receiver device over the second broadcast channel different from the first broadcast channel; and
   a second apparatus coupled to a gateway device using a station-to-transmitter link, the second apparatus comprising:
      a second processor configured to cause transmission of a second robust frame over the second broadcast channel to the receiver device, wherein the first and second robust frames are coherent signals.

8. The SFN of claim 7, wherein the first apparatus further comprises a timing circuit configured to control timing of broadcasts from the second antenna.

9. The SFN of claim 7, wherein the first processor is further configured to form the first layer estimate by regenerating an estimated bit-interleaved coded modulation signal.

10. The SFN of claim 7, wherein the received signal received from the second SFN includes control information, and wherein the first processor is further configured to form the first robust frame by encoding the second layer estimate based at least in part on the control information.

11. The SFN of claim 10, wherein the control information comprises timing information.

12. The SFN of claim 7, wherein the first antenna couples the first apparatus to a multi-channel gateway.

13. A Single Frequency Network (SFN), comprising:
   a first apparatus coupled to a gateway device using a station-to-transmitter link, the first apparatus comprising:
      an antenna tuned to a first broadcast channel associated with a first frequency band;
      a first processor coupled to the first antenna and the second antenna, the first processor configured to:
         receive, on the station-to-transmitter link, a signal comprising first data and second data;
         form a first layer by processing the first data;
         form a second layer by processing the second data;
         form a first frame by adding the first layer to the second layer; and wirelessly broadcast, using the antenna and to a receiver device, the first frame on the first broadcast channel associated with the first frequency band, wherein the first data comprises a television signal for transmission on the first broadcast channel; and wherein the second data comprises a second television signal for transmission in a second SFN on a second broadcast channel different from the first broadcast channel, wherein the second broadcast channel is associated with a second frequency band different from the first frequency band; and a second apparatus comprising a second processor configured to:

cause reception of a second frame from the second SFN;

generate a third frame based on the second frame; and cause transmission of the third frame to the receiver device, wherein the first and third frames are coherent signals.

14. The SFN of claim 13, wherein to form the second layer the first processor is configured to use a power for the second layer that is less than a power of the first layer.

15. The SFN of claim 13, wherein to form the first frame the first processor is configured to form the first frame comprising a bootstrap signal.

16. The SFN of claim 13, wherein to form the second layer the first processor is configured to process the second data comprising control information corresponding to a future transmission of the second data on the second broadcast channel.

17. The SFN of claim 13, wherein to the first frame the first processor is configured to form the first frame compliant with an Advanced Television Systems Committee (ATSC) 3.0 specification.

18. The SFN of claim 13, wherein the first processor is further configured to broadcast the first frame substantially simultaneously from two transmitters on the first broadcast channel.

19. The SFN of claim 13, wherein:

to process the first layer, the first processor is configured to encode the first data using a low-density parity check (LDPC) code having a first code rate; and to process the second layer, the first processor is configured to encode the second data using an LDPC code having a second code rate.

* * * * *